United States Patent
Toumbas

[19]

[11] Patent Number: 5,940,356
[45] Date of Patent: Aug. 17, 1999

[54] MODULAR COMPACT DISK FILING SYSTEM WITH AUTOMATIC DISK SELECTION AND PLAYING, WHICH PERMITS MODULAR EXPANSION IN ALL THREE DIMENSIONS

[76] Inventor: Christos Toumbas, 50 Nymfon str. N. Iraclio, Athens, Greece, 141-21

[21] Appl. No.: 08/676,401
[22] PCT Filed: Dec. 14, 1995
[86] PCT No.: PCT/GR95/00024
  § 371 Date: Jul. 23, 1996
  § 102(e) Date: Jul. 23, 1996
[87] PCT Pub. No.: WO96/18997
  PCT Pub. Date: Jun. 20, 1996

[30]   Foreign Application Priority Data
Dec. 16, 1994  [GR]  Greece ............................... 940100561

[51] Int. Cl.⁶ .................................................. G11B 17/22
[52] U.S. Cl. ............................................. 369/36; 360/92
[58] Field of Search ................................ 360/92, 98.04, 360/98.06; 369/36, 178, 191–193; 414/277, 278, 280, 751

[56]   References Cited

U.S. PATENT DOCUMENTS

| | | | |
|---|---|---|---|
| 4,989,191 | 1/1991 | Kuo ............................................ | 369/36 |
| 5,128,912 | 7/1992 | Hug et al. .................................. | 369/36 |
| 5,293,284 | 3/1994 | Sato et al. .................................. | 360/92 |
| 5,303,214 | 4/1994 | Kulakowski et al. .................... | 369/34 |
| 5,546,366 | 8/1996 | Dang ......................................... | 360/92 |
| 5,631,785 | 5/1997 | Dang et al. ............................... | 360/92 |

*Primary Examiner*—Brian E. Miller
*Attorney, Agent, or Firm*—Webb Ziesenheim Logsdon Orkin & Hanson, P.C.

[57]   ABSTRACT

The invention is about a modular system for filing, automatically selecting and playing digital disks infinitely expandable in all the three dimensions with a corresponding increase in the number of digital disks filed. A microcomputer (PC) controls the servomechanisms utilized by the system to move around the digital disks, with the use of information files describing the stored digital disks contents and the system topology. The system can be expanded by adding an infinite number of three basic structural unit modules in all the three dimensions and updating the system information files at the same time. In such a system the user stores each digital disk once and, after that, uses his information records, by manipulating the related data base, to form selection sequence files to be played. The user can customize the system according to his/her needs either by increasing its storage capacity or by modifying its topology. According to the above described, the process of filing and using digital disks is simplified and the user can satisfy his/her personal or, most important, professional requirements to the maximum.

9 Claims, 37 Drawing Sheets

BB'

DD'

GG'

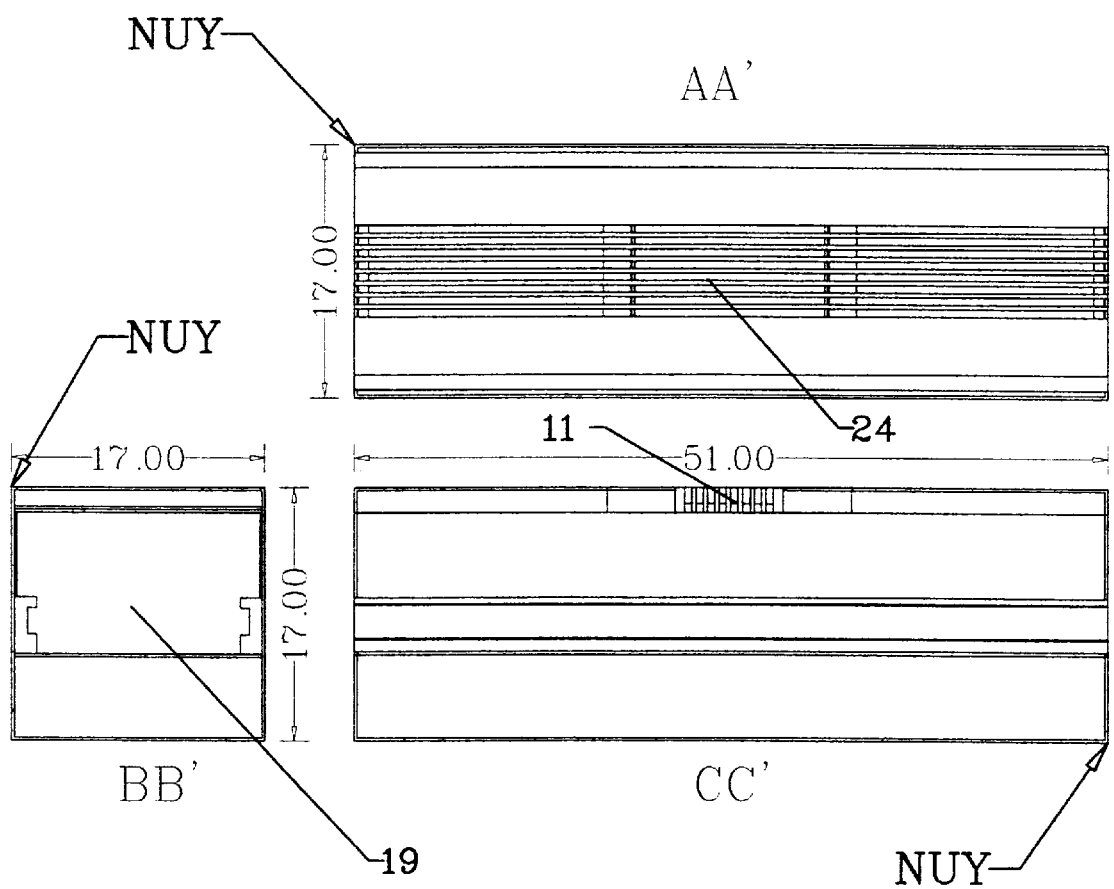

FIG. 37
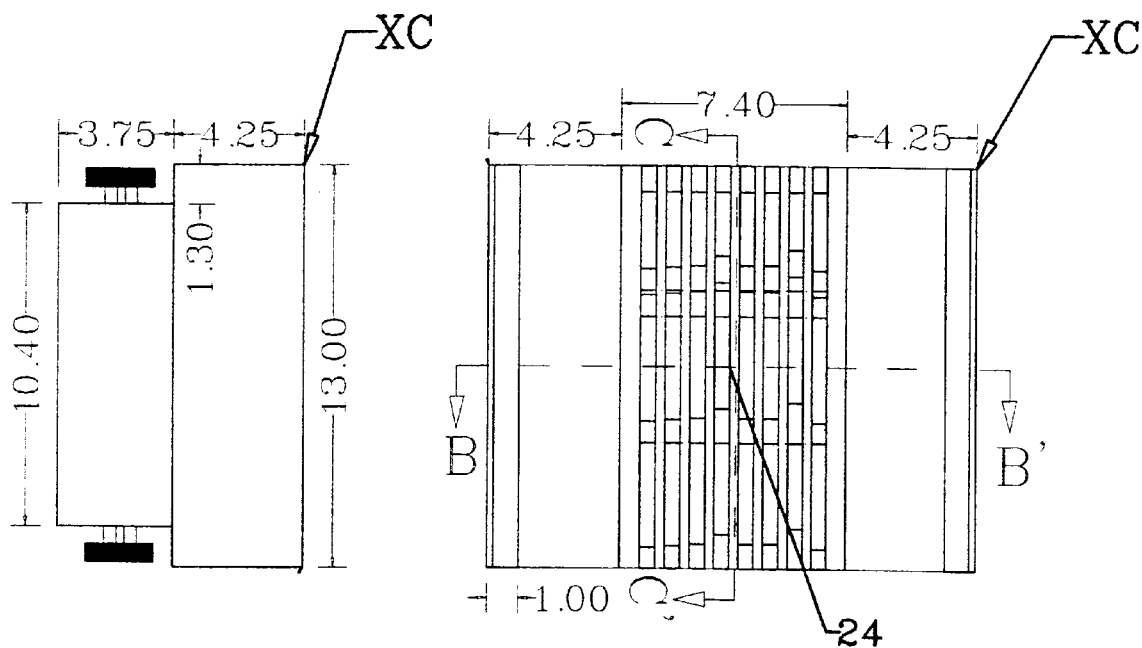
FIG. 38
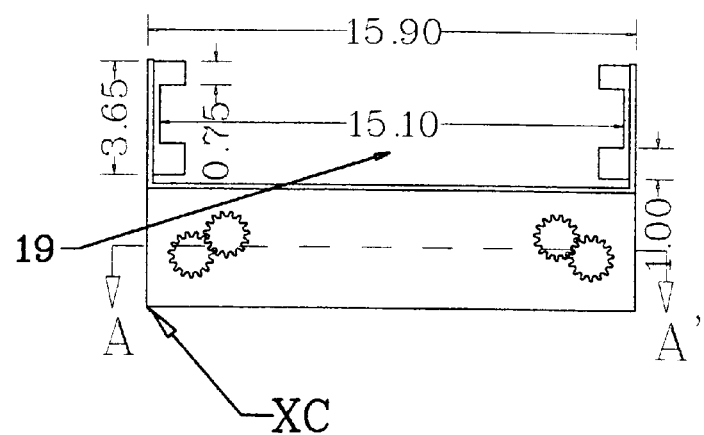
FIG. 39

FIG. 41
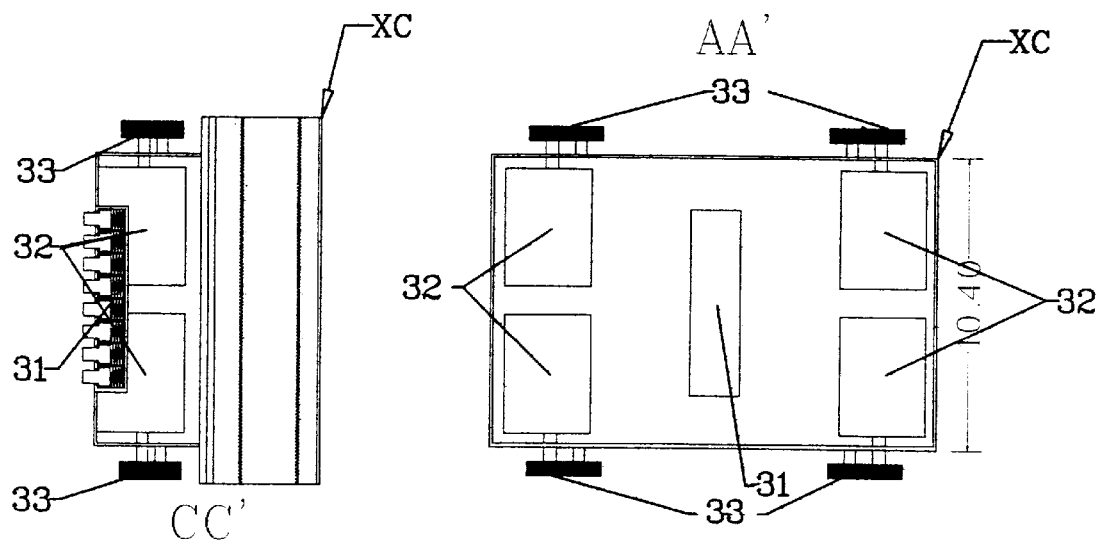
FIG. 42
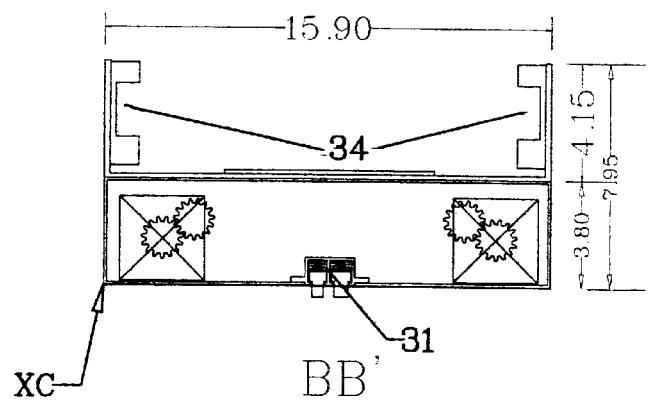
FIG. 43

FIG. 45
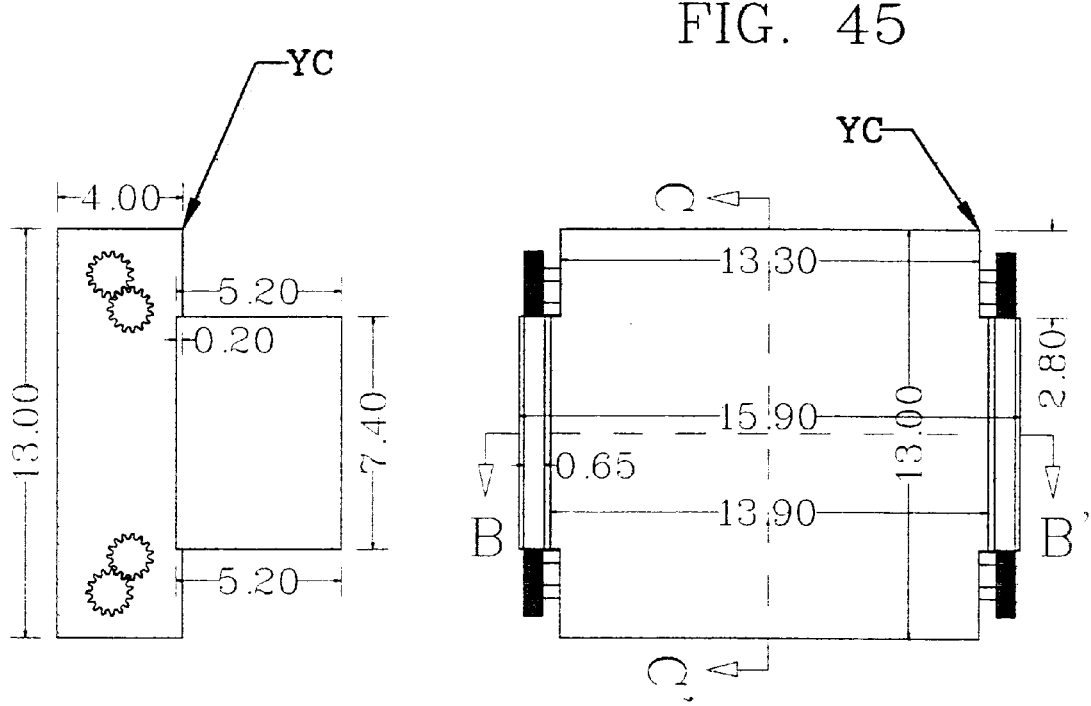
FIG. 46
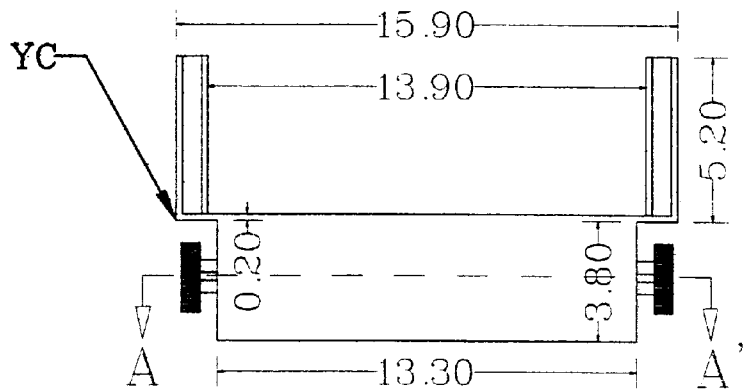
FIG. 47

FIG. 49
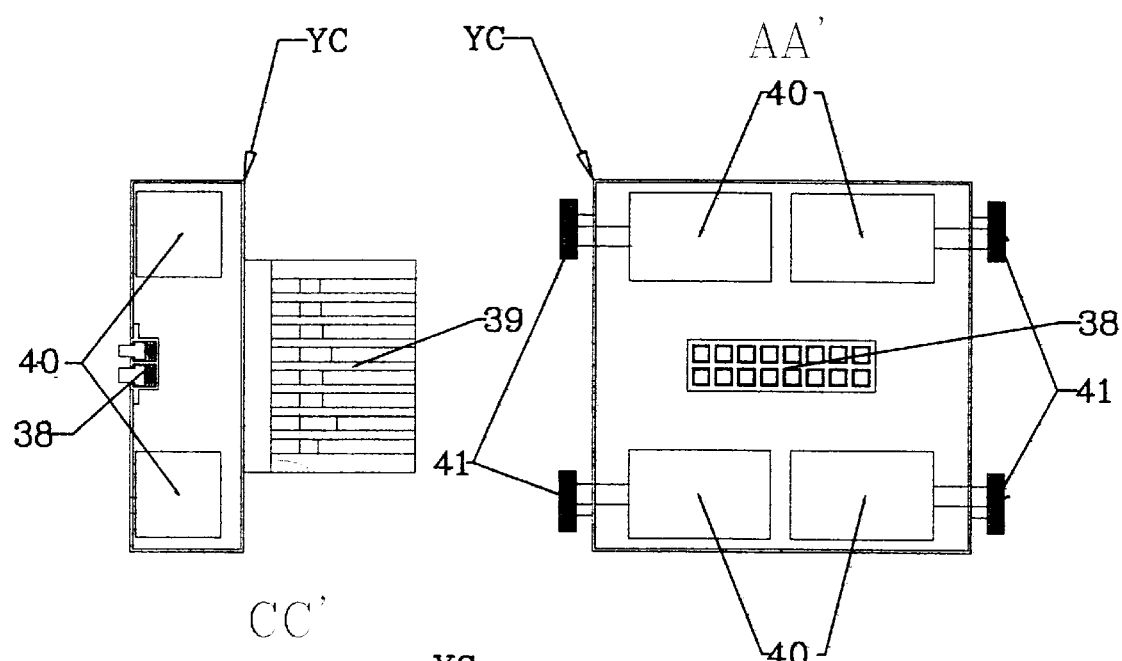
FIG. 50
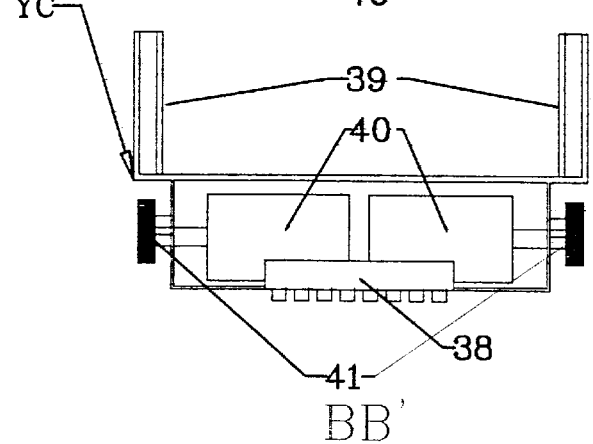
FIG. 51

FIG. 53
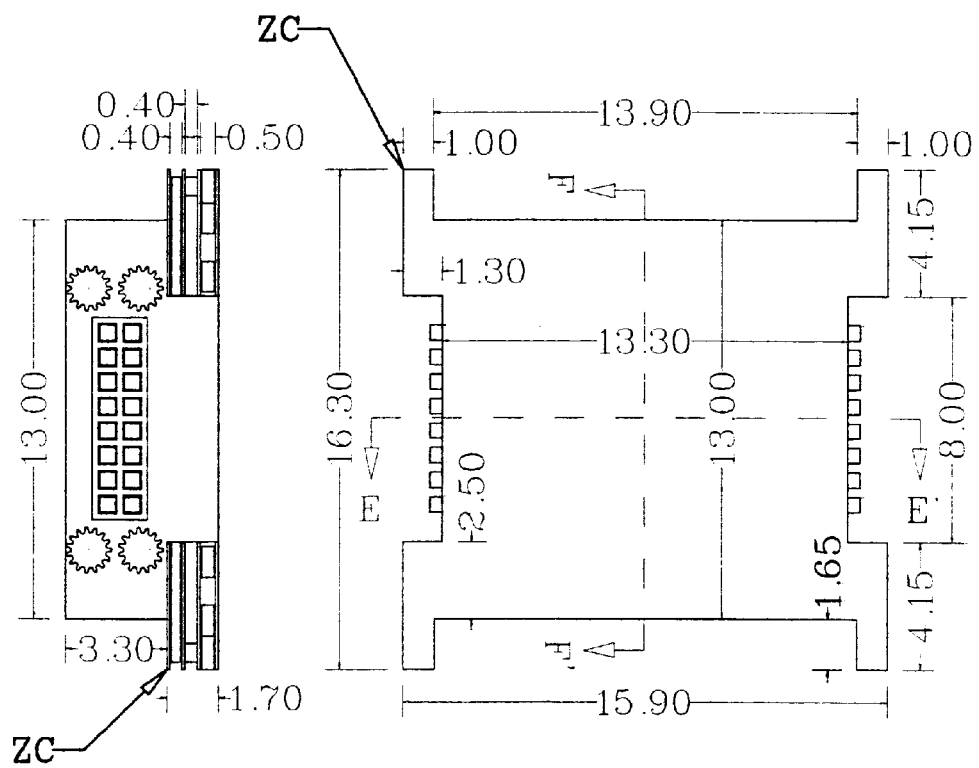
FIG. 54
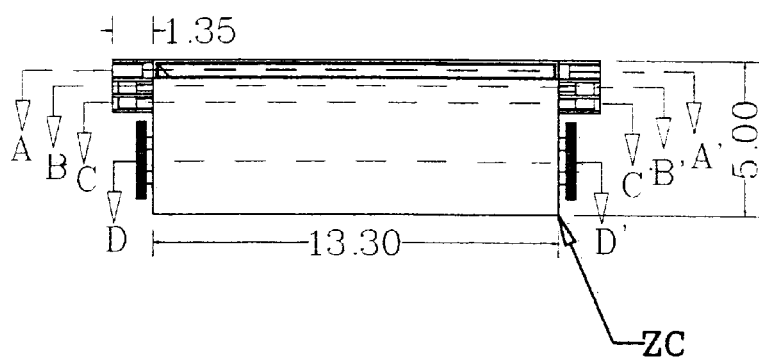
FIG. 55

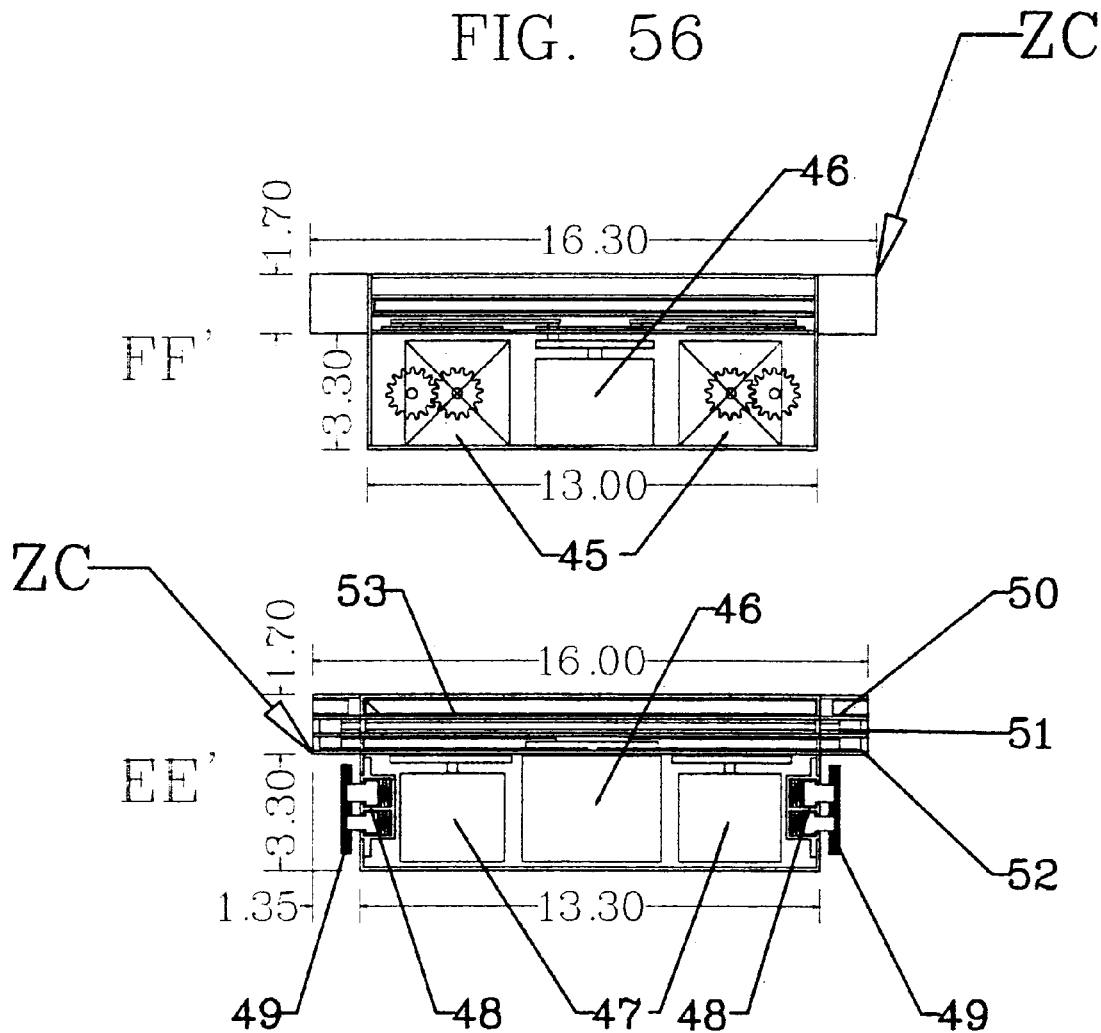

MODULAR COMPACT DISK FILING SYSTEM WITH AUTOMATIC DISK SELECTION AND PLAYING, WHICH PERMITS MODULAR EXPANSION IN ALL THREE DIMENSIONS

FIELD OF THE INVENTION

This invention is an automatic modular system for filing and playing compact discs (CDs) with unlimited expansion capabilities over the three dimensions of space and a corresponding increase in the CD capacity, where a microcomputer (PC) has the control of the CD selection and playing, utilizing information files (data base) and with the help of several servomechanisms. (From this point on and throughout the text, the term CD is used to represent any sort of digital disk and is not limited to any certain type, such as audio-CD or other).

BACKGROUND OF THE INVENTION

The system utilizes known technology, such as CD player units of various CD formats (i.e. audio-CD, photo-CD, CD-ROM etch.), microcomputer units (PCs) and their peripherals and step-motors with their drives and indexers. The concept of a device which selects music records by pressing the appropriate buttons and automatically plays the selections is fairly old (Juke Box) and has been widely utilized for vinyl music records. Nowadays, there are devices that store digital disks, Audio-CD or CD-ROM, with the capability of choosing and playing the pre-selected recorded material. Those systems cannot, in any way, be described as filing systems, because they can store only a limited number of disks and they are not expandable.

SUMMARY OF THE INVENTION

The proposed system bears the following characteristics:

As a filing system it can be expanded not only in one or two, but in all three dimensions of space, to cover the need for increased number of CDs, and at the same time updating the information files of the PC with the CD contents and the system topology. The capacity of a stand alone system is between 100 and 38,050 CDs whereas in a network of such systems it is practically and theoretically unlimited.

As an automatic modular system for filing and playing CDs it selects, by mechanical means, the desired CD and carries it to the CD player. It plays the selection and returns the CD to its original position.

The system accomplishes the aforementioned characteristics using the following structure described below:

It has a basic module, the Control and playing Unit (CU), which is the basic system and controls the system functions, performs the management of the information files, controls the communication interface through a PC and its peripherals.

It can be expanded with the addition of new CD storage modules, the Storage Units (SU), which are added to the CU over all three dimensions, thus increasing the filing capabilities of the system.

It has a Disk Transportation Channel (DTC), which branches from the CU to all the SUs of the system all over the three dimensions and which utilizes node modules, the Node Units (NUX, NUY) as its branch nodes.

It utilizes the DTC to move the CD (placed on a special case the Disk Case—DCs), between the CU (which is responsible for the playing as well as the physical and data I/O of the CD) and the SU (where the CDs are stored). The transport of the DCs, carrying the CD, is accomplished with carrier mechanisms, such as the X Carrier (XC)—responsible for the X-dimension move, the Y Carrier (YC)—responsible for the Y-dimension move and the Z Carrier (ZC)—responsible for the Z-dimension (vertical) move, where XYZ corresponds to three dimensions in space.

Using the CU, which, as already mentioned, is the basic independent system with a capacity of 100 CDs, as a base we can increase, practically without limit, the system capacity according to our needs, with the addition of NUX and NUY units, at the base level, and a stack of SUs, on top of them, with a capacity of 150 CDs each SU. For each additional unit (NUX, NUY, SU) and each additional CD, both the system information files containing the system topology and the CD ID, i.e. its position coordinates, contents, registration information etc., are updated correspondingly. Using the system, the user can expand the system into all three dimensions, according to his/her available space and the amount of his/her CDs, adding NUXs, NUYs and SUs. The fact that the system expands into all three dimensions does not create any access problem because the access is realized by the system itself with the aid of servomechanisms (XC, YC, ZC).

The system allows a user to choose any selection from any stored CD, using any of the CU inputs (i.e. keyboard or remote control accessing the serial input) through various appropriate interface programs or data files. The PC, based on the updated information files, will locate the CD which contains the desired selection and its position co-ordinates and will activate the appropriate servo-units (XC, YC, ZC) to carry the CD to the CU's CD player unit. The system will pick up and play the selection and, finally, will restore the CD to its original position.

The system can store a selection sequence in a data file, which, when activated, will play the whole sequence one selection after the other. By using two CD players, while playing one selection, the system will process the next one. The selections can be done using criteria based on the CD information file data. For example, if we have a system containing audio-CDs and we have made records of the recording dates, the type of music, the tempos, the song's duration, the vocalists etc., we can produce a data file with slow ballads, recorded during the 70's, performed by female vocalists with a total duration of, say, 2 hours and 15 minutes and the PC will create a program with random selection according to those criteria.

A user of the system can reconstruct the system, moving the constructional Units (NUX, NUY, SU) or the CDs without the need to reenter data in the CD information files, changing only the topology information file.

A user of the system can move parts of his/her system, by removing SUs along with their CD contents, to another similar system along with the relative part of the information files. According to the above mentioned, the CD filing and using process is substantially simplified and the user is given the capability of fully taking advantage of his/her CD compilation, for his/her personal satisfaction, the needs of a social gathering or, most importantly of all, his/her professional requirements.

DESCRIPTION OF DRAWINGS

The system structural units and the above mentioned carriers, are presented in the following drawings:

FIG. 29, 30 & 31 present a horizontal and two vertical cross-sections of the NUY;

FIG. 37, 38 & 39 present the top, a side & the front view of the XC, respectively;

FIG. 41, 42 & 43 present a horizontal and two vertical cross-sections of the XC;

FIG. 45, 46 & 47 present the top, a side & the front view of the YC, respectively;

FIG. 49, 50 & 51 present a horizontal and two vertical cross-sections of the YC;

FIG. 53, 54 & 55 present the top, a side & the front view of the ZC, respectively;

FIG. 56 & 57 present two vertical cross-sections of the ZC;

DETAILED DESCRIPTION

Figure 1:
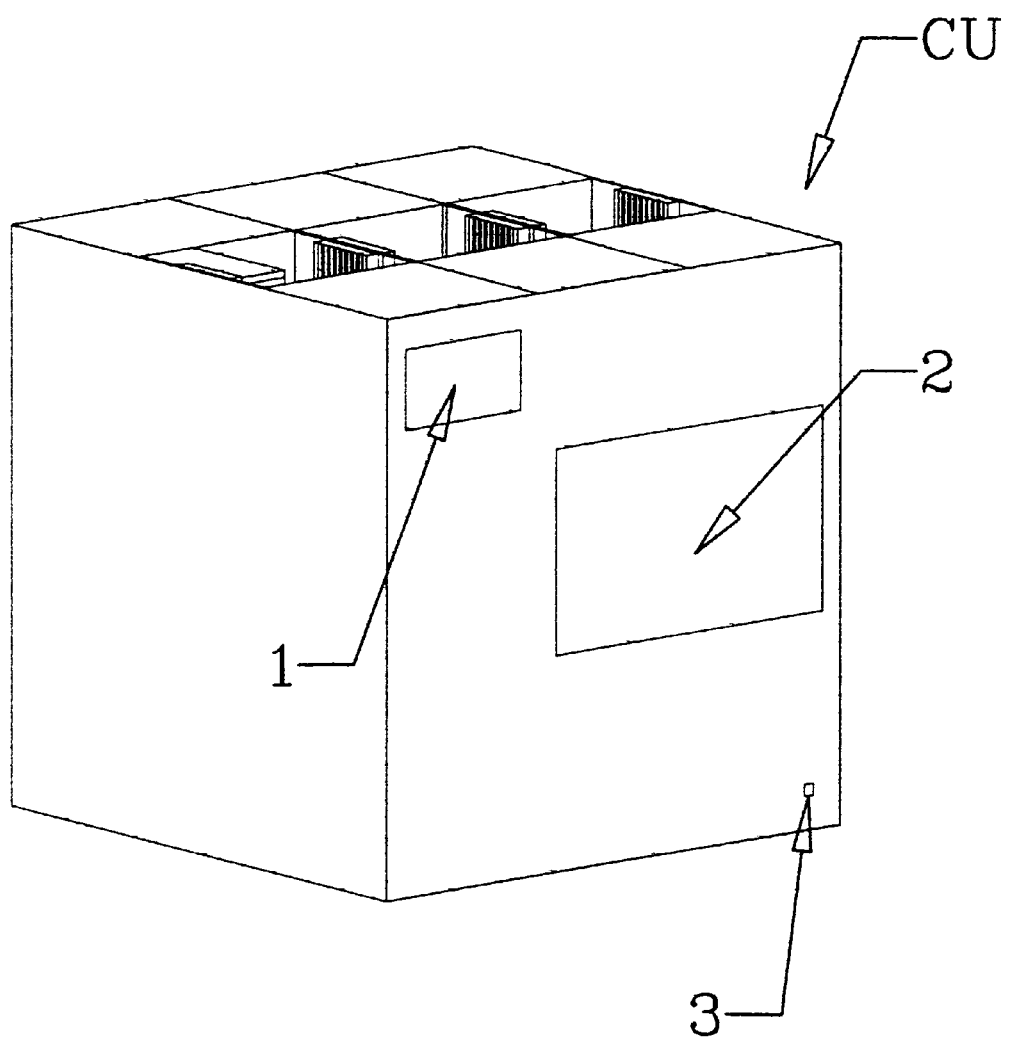
FIG. 1 presents a perspective view of the Control and playing Unit (CU)
Figure 2:
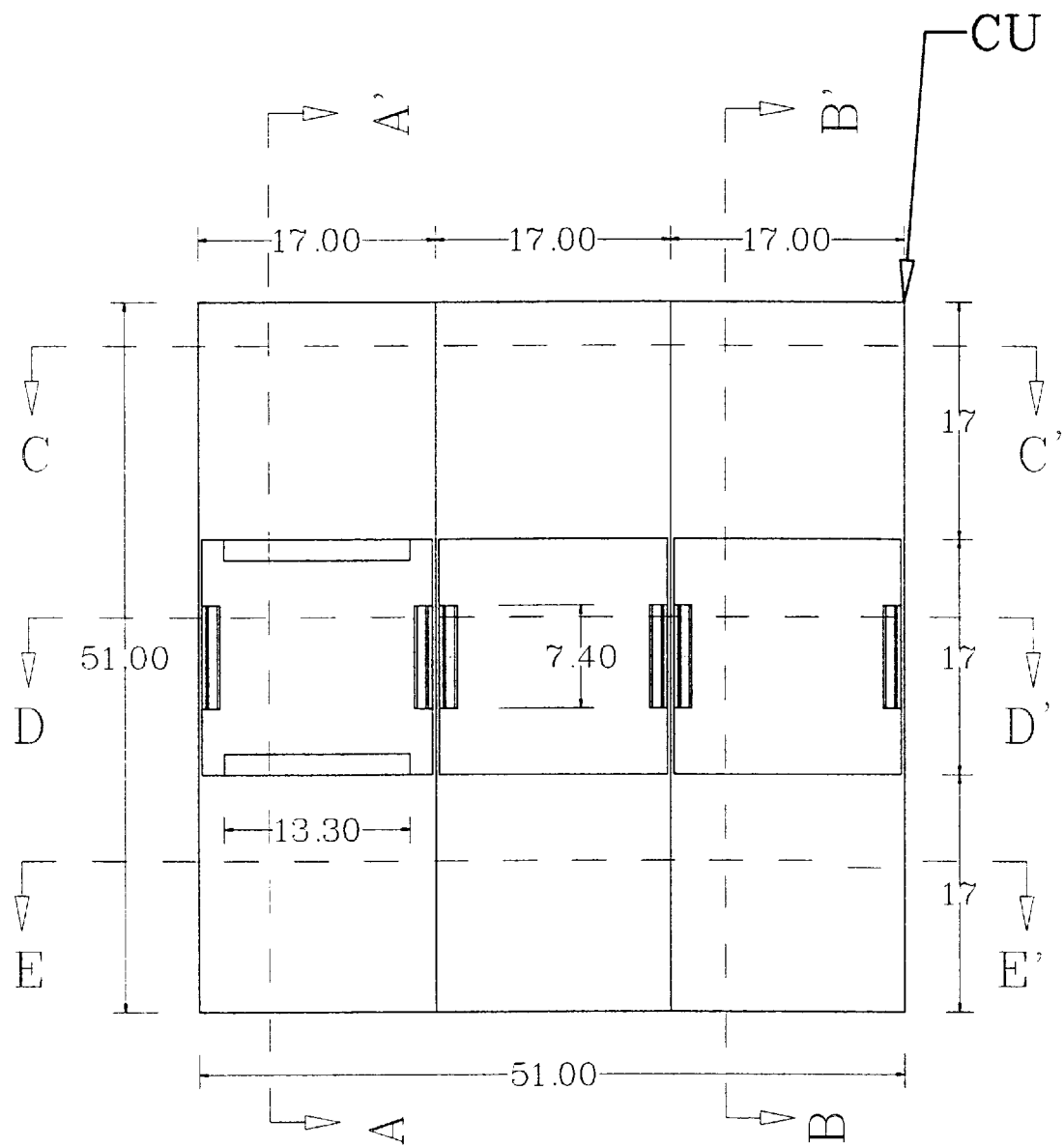
FIG. 2 presents a top view of the CU.
Figure 3:
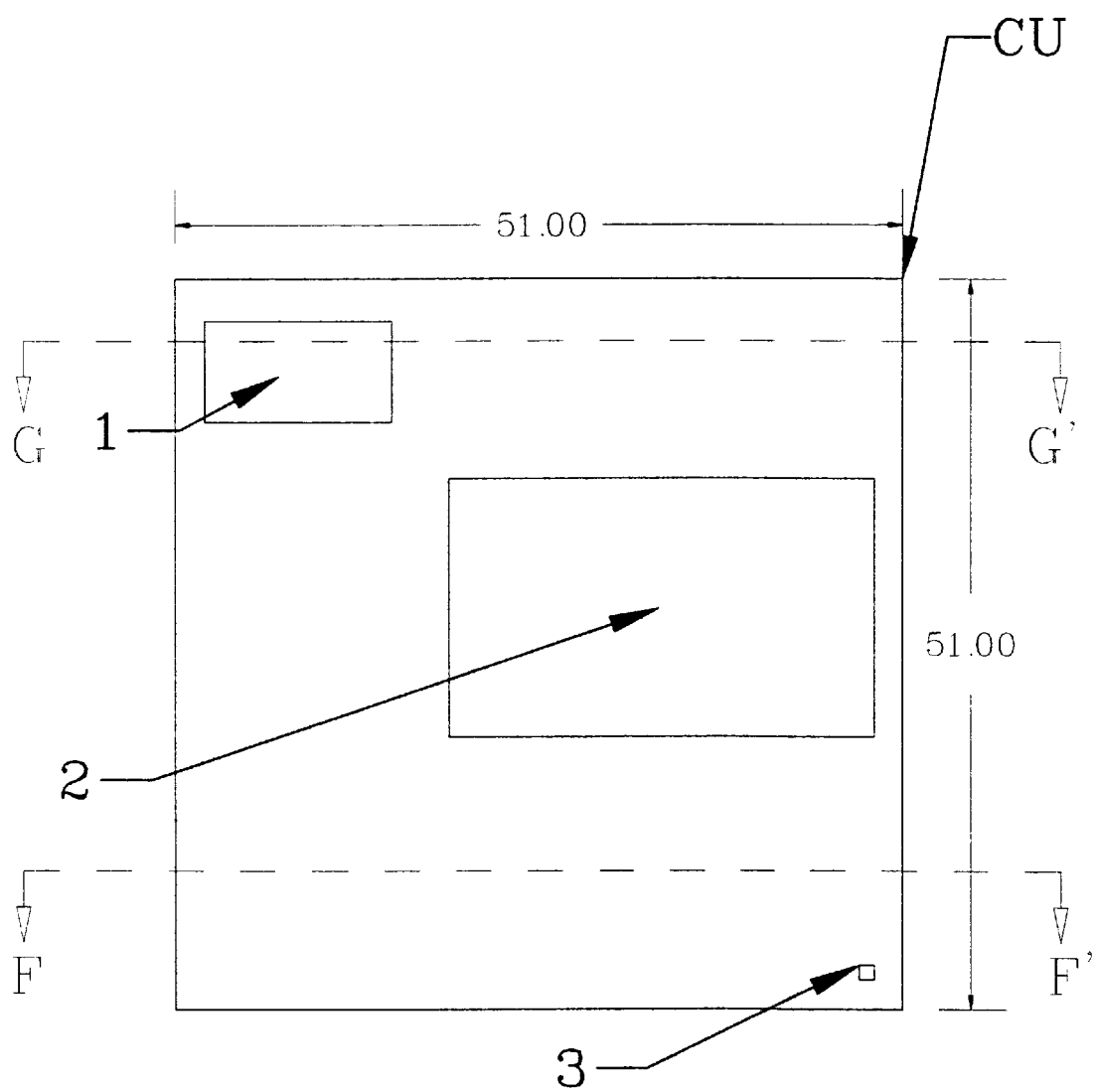
FIG. 3 presents a front view of the CU.
Figure 4:
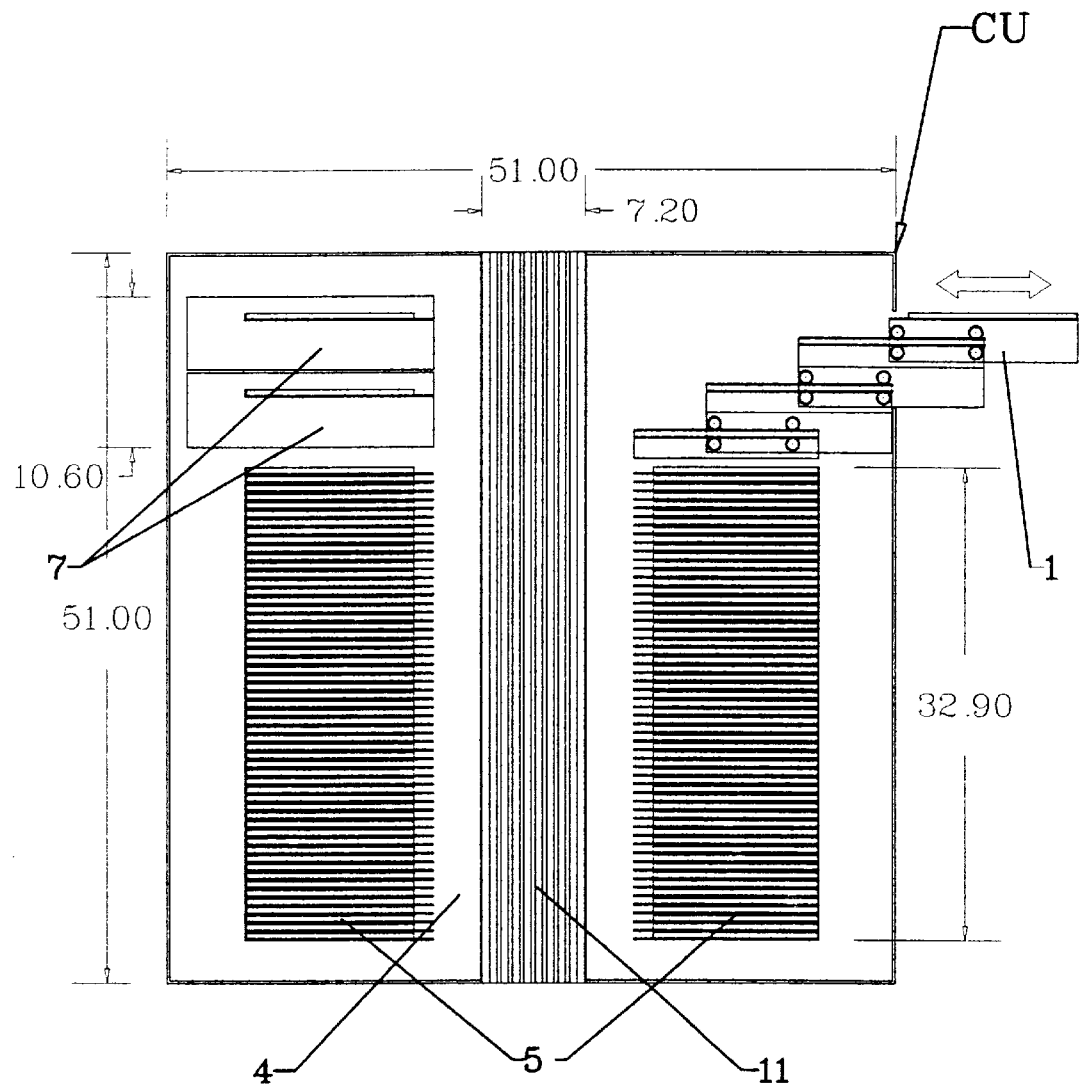
FIG. 4,5,6, 7 & 8 present five vertical cross-sections of the CU.
Figure 5:
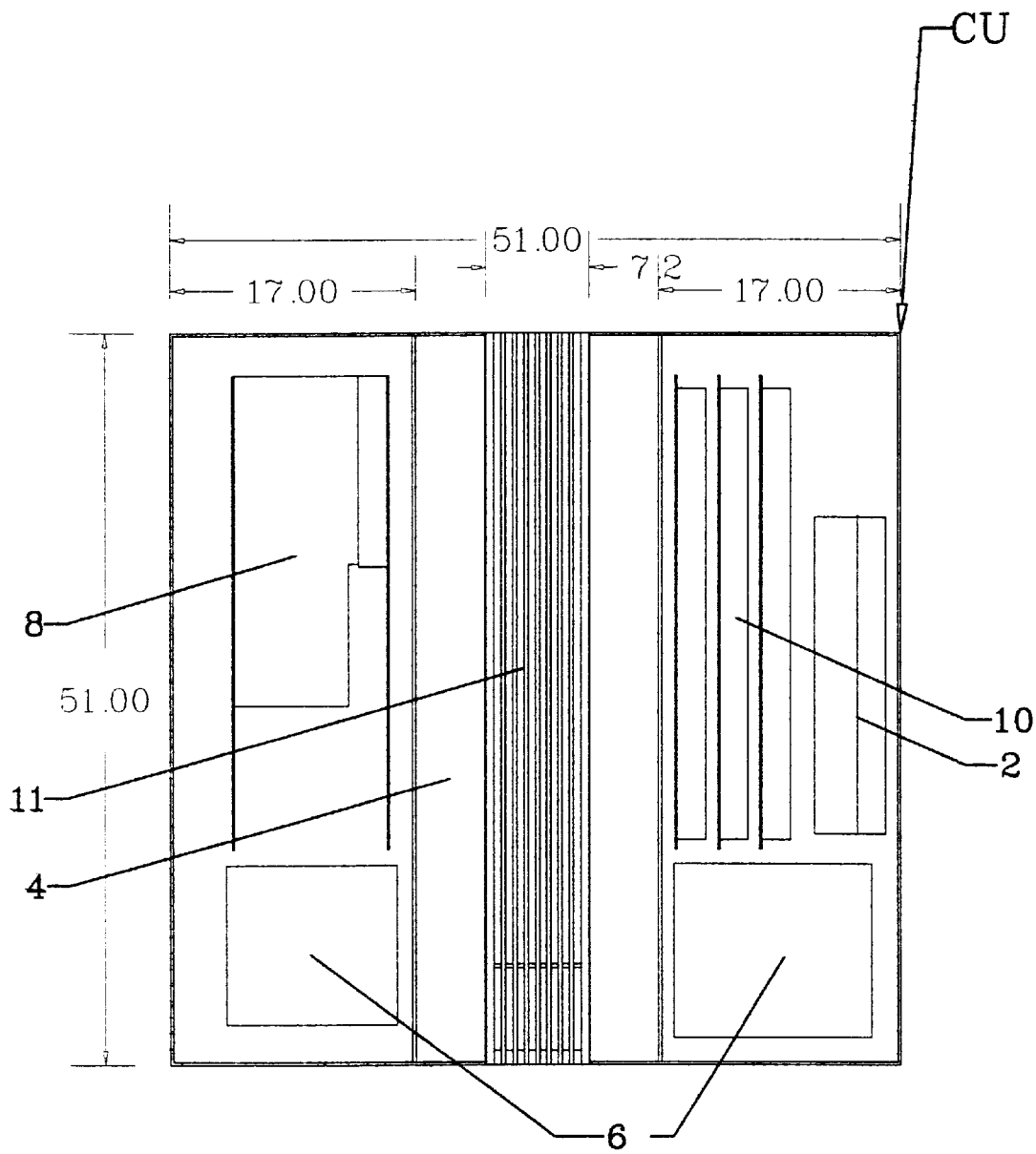
Figure 6:
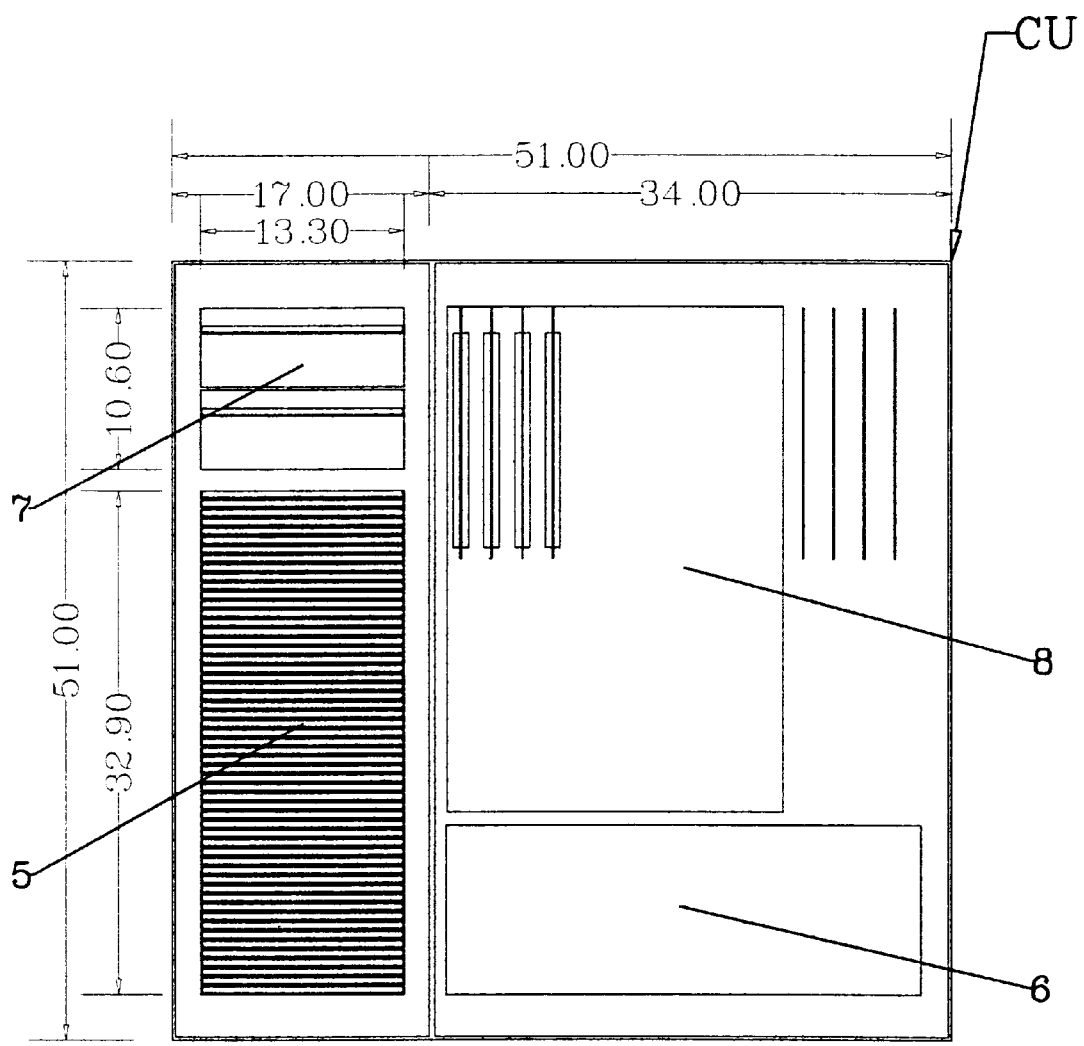
Figure 7:
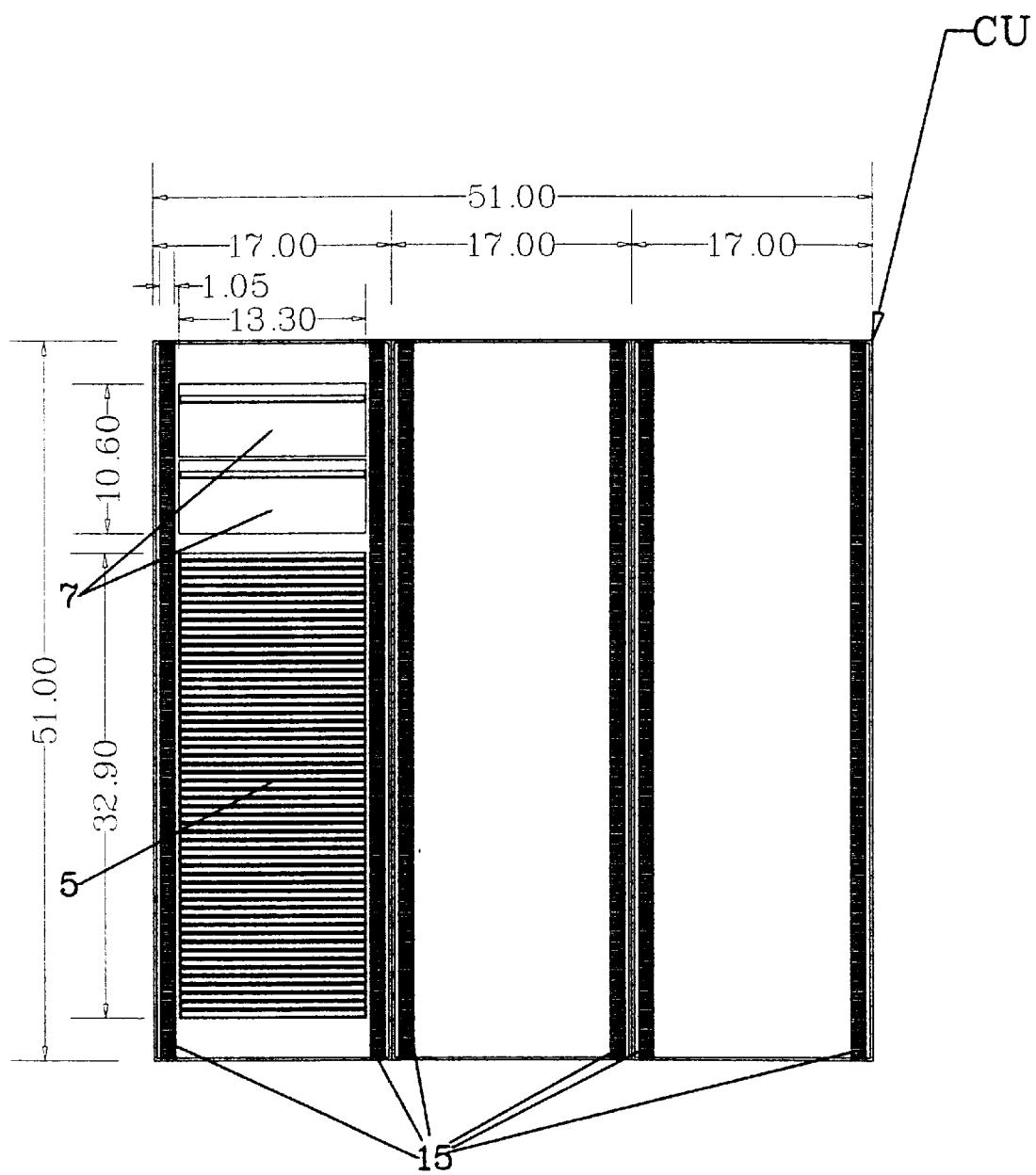
Figure 8:
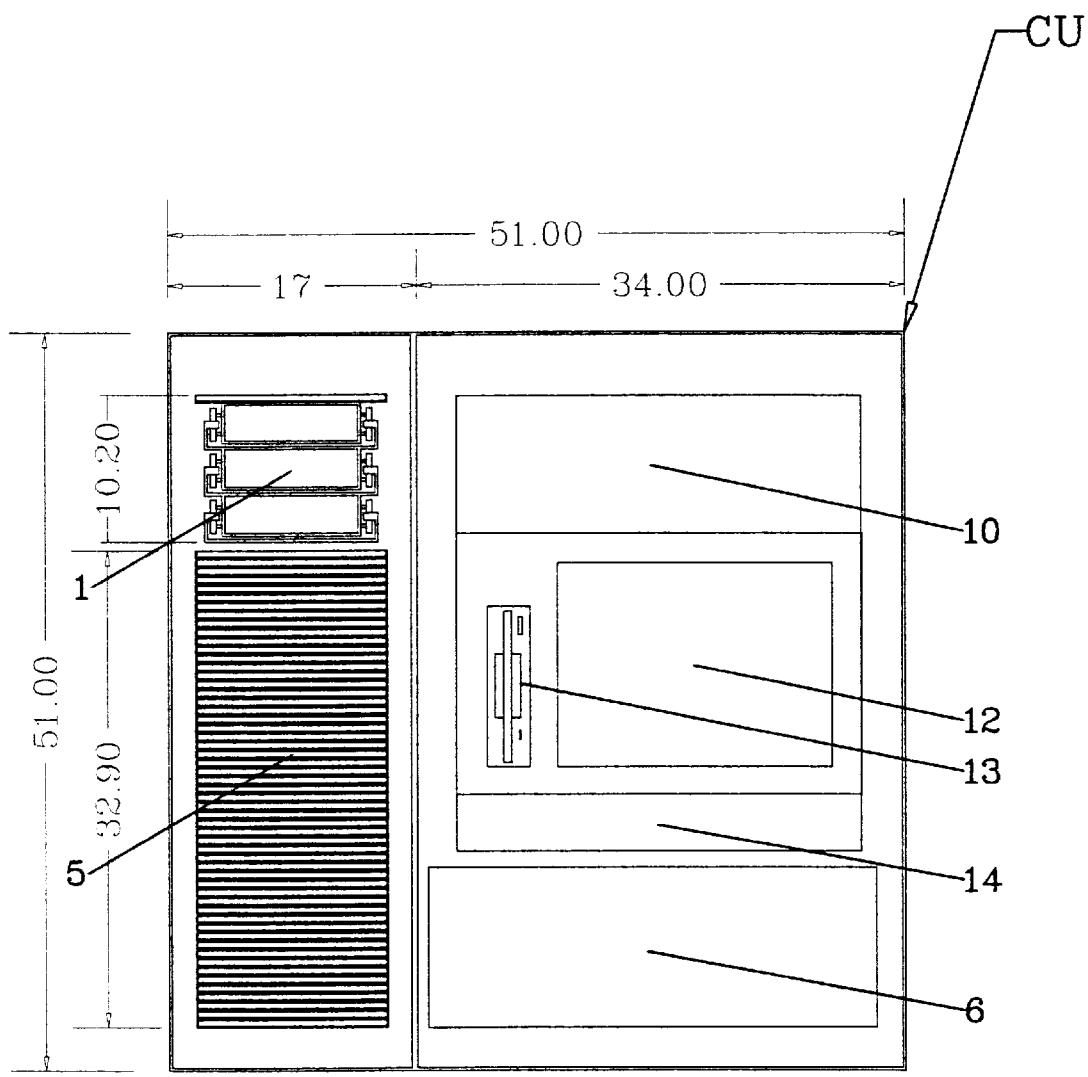
Figure 9:
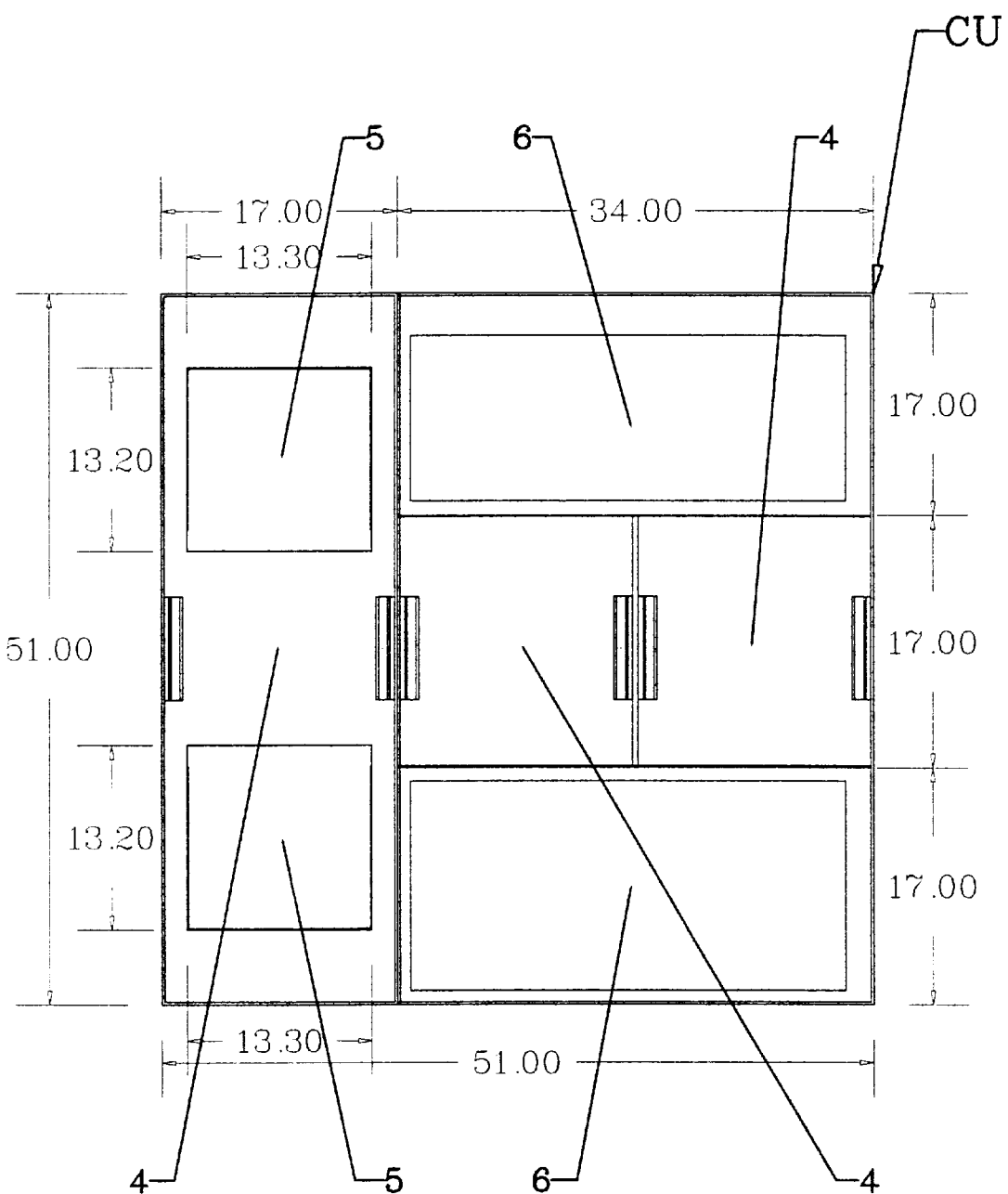
FIG. 9 & 10 present two horizontal cross-sections of the CU.
Figure 10:
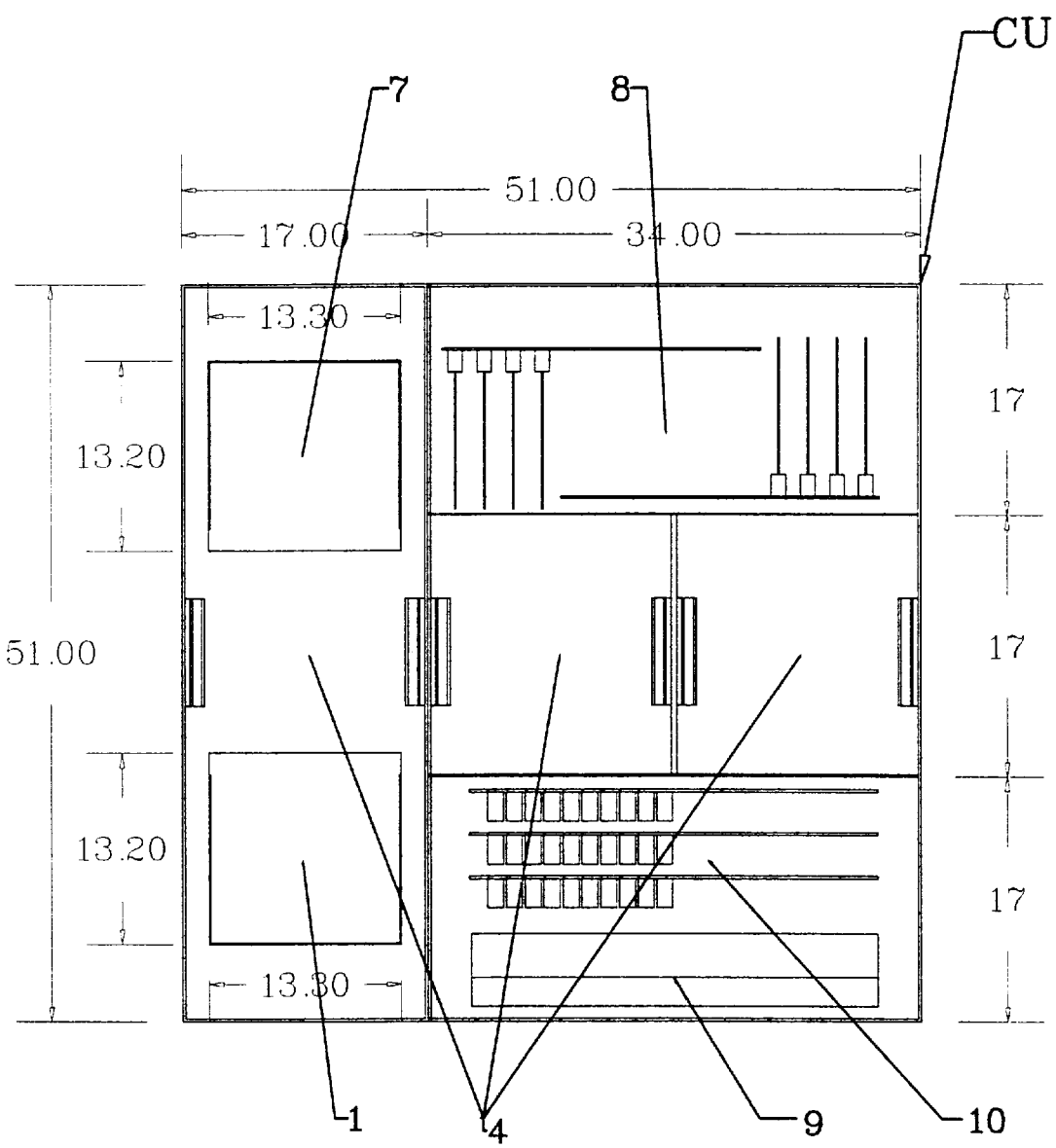
Figure 11:
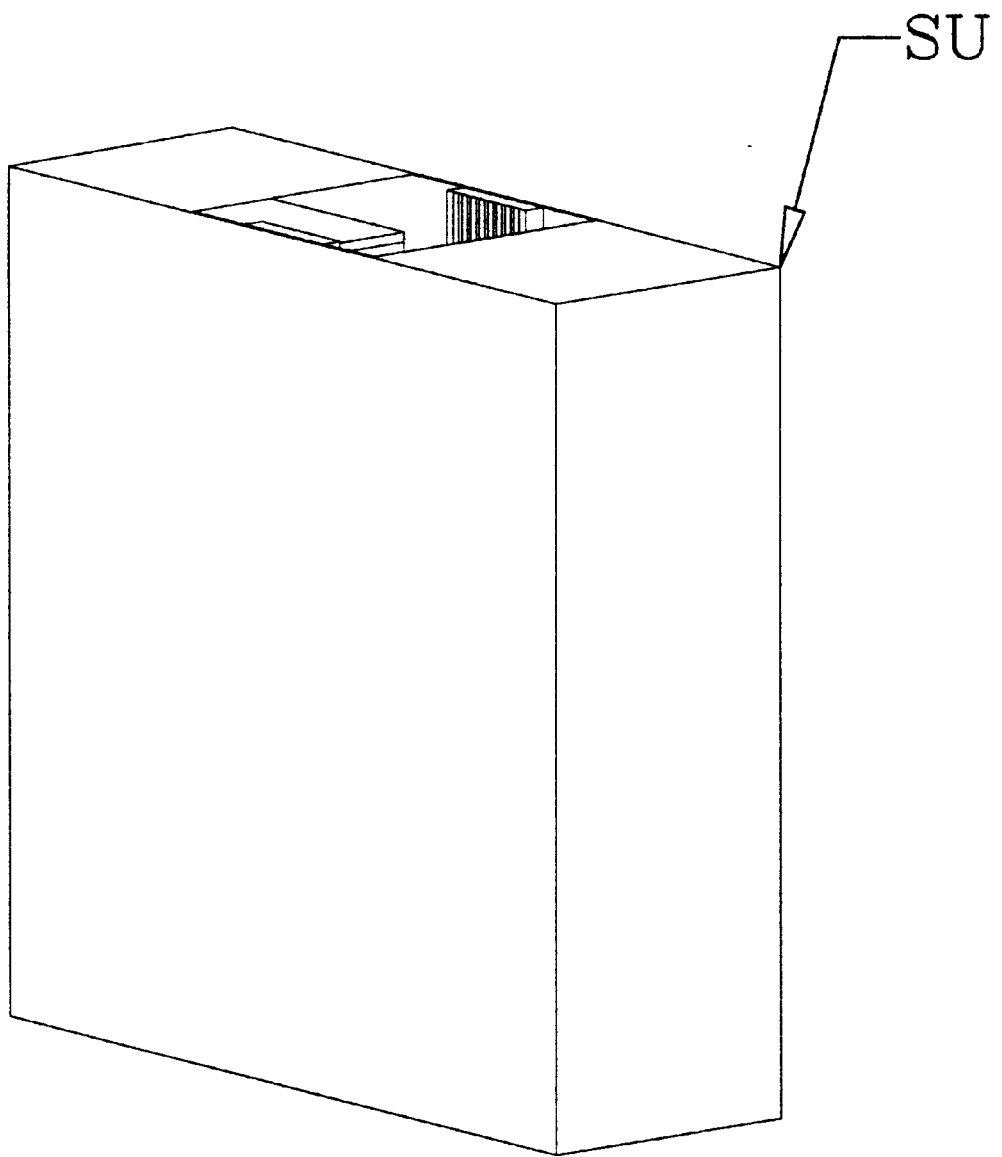
FIG. 11 presents a perspective view of the Storage Unit (SU)
Figures 12, 13, 14:
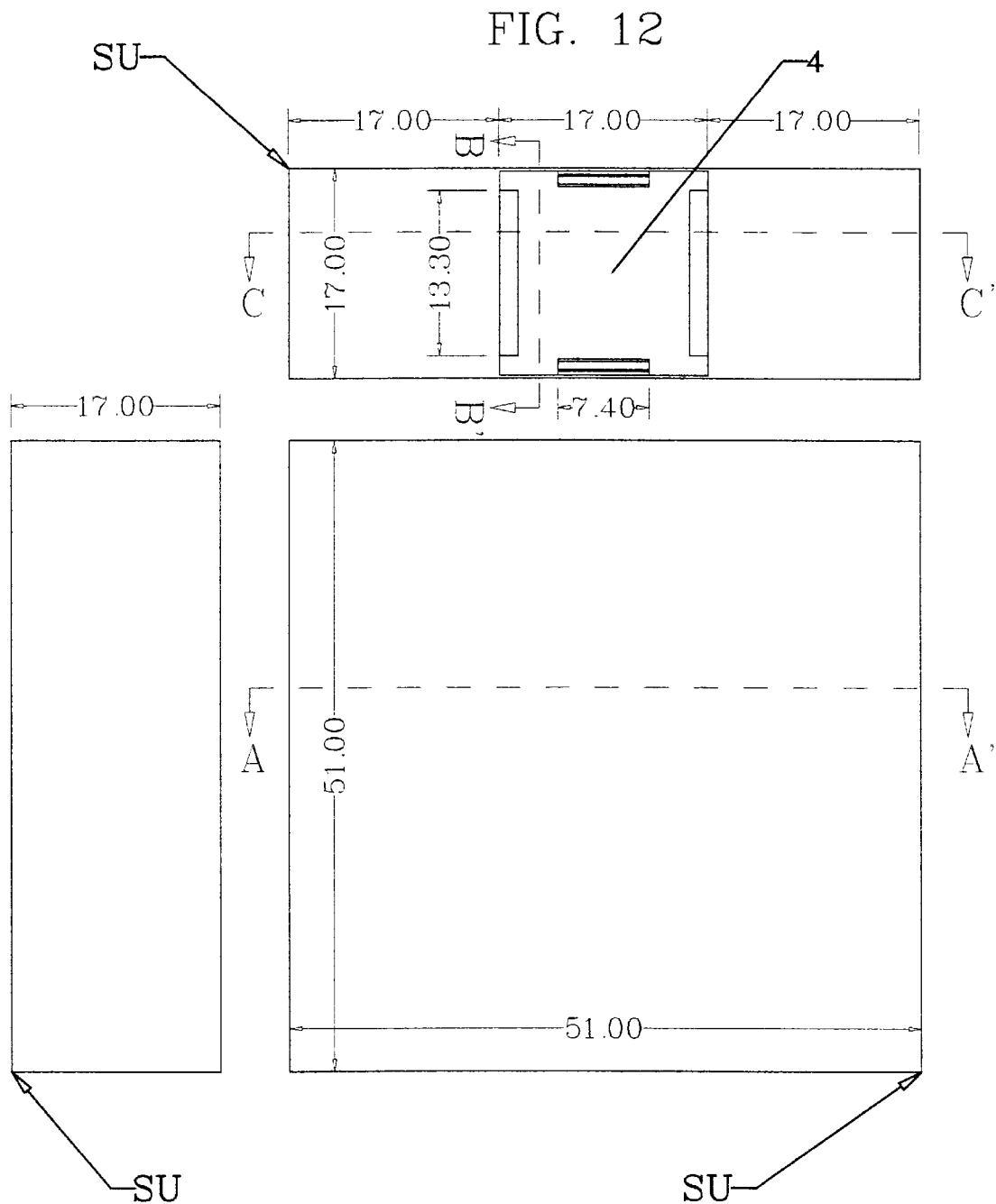
FIG. 12, 13 & 14 present the top, a side & the front view of the SU, respectively.
Figures 15, 16, 17:
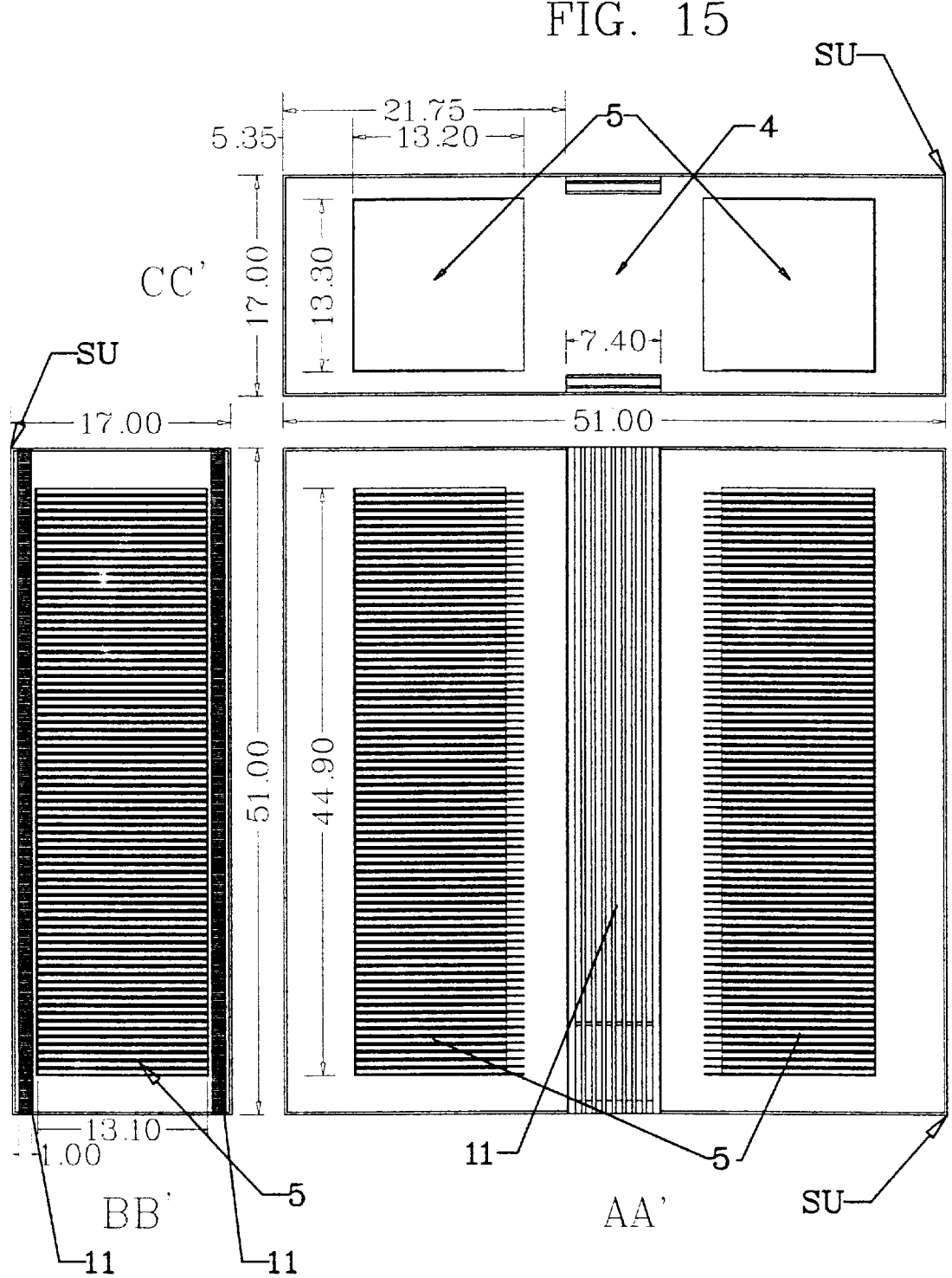
FIG. 15,16 & 17 present a horizontal and two vertical cross-sections of the SU.
Figure 18:
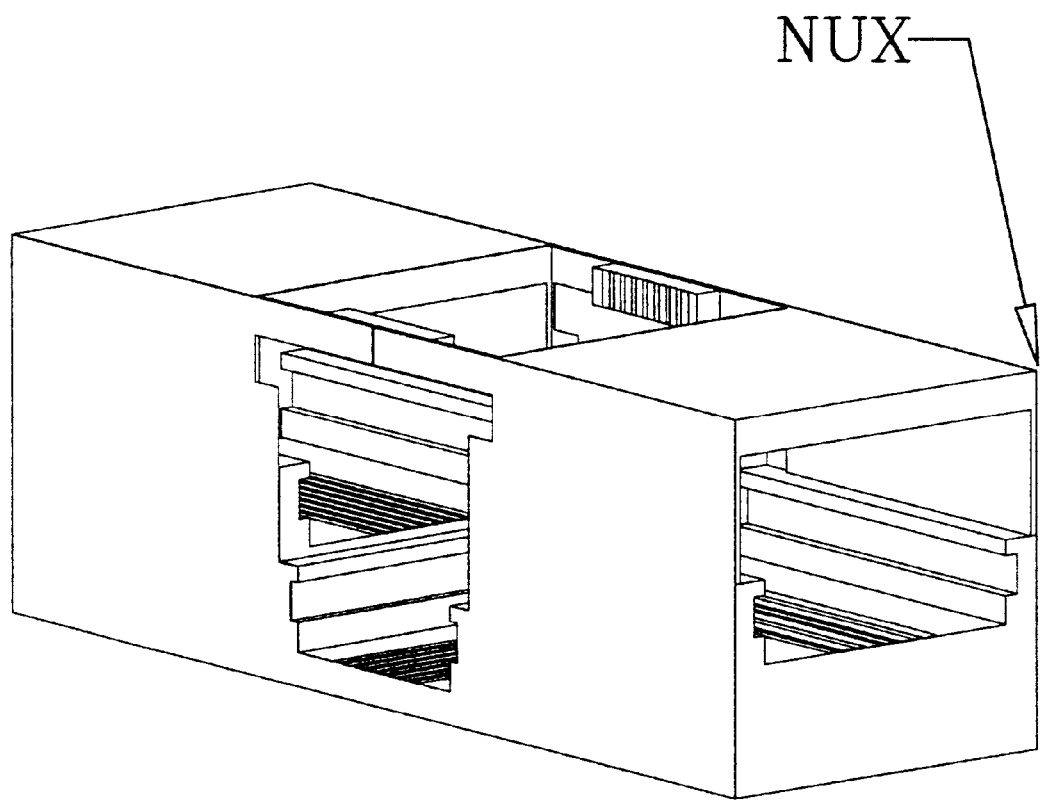
FIG. 18 presents a perspective view of the Node Unit X (NUX)
Figures 19, 20, 21:
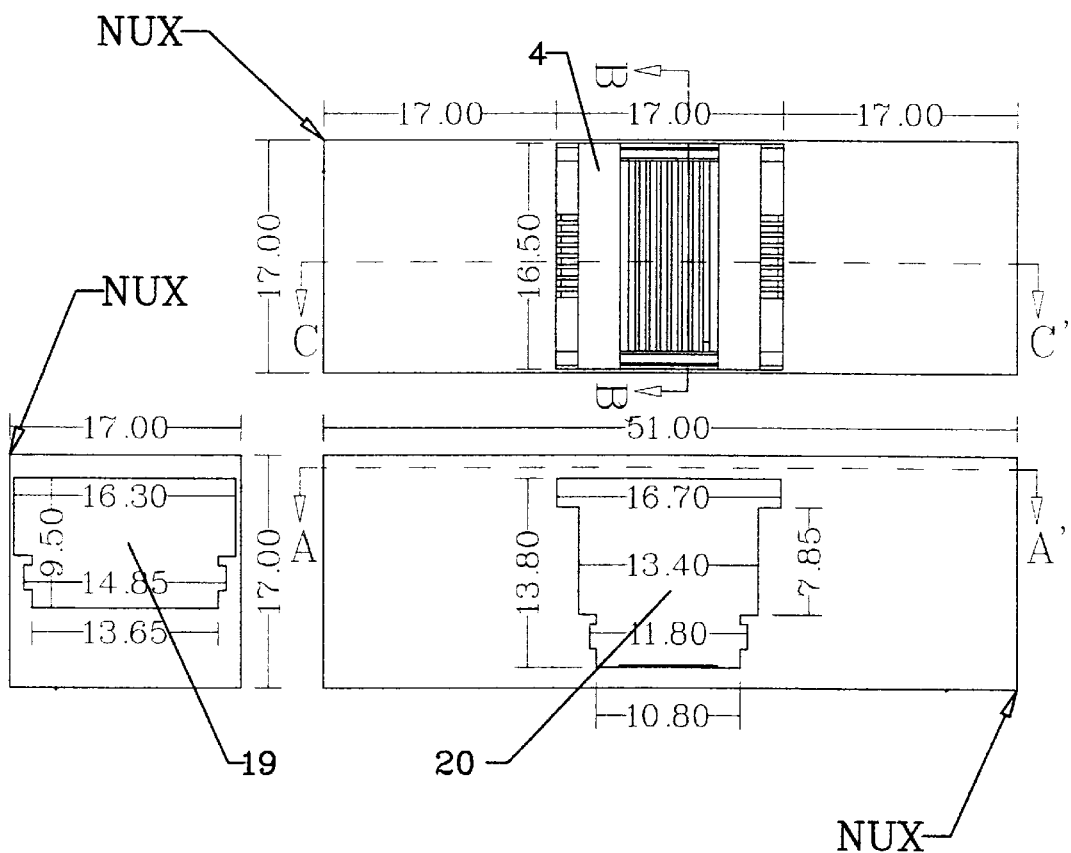
FIG. 19,20 & 21 present the top, a side & the front view of the NUX, respectively.
Figures 22, 23, 24:
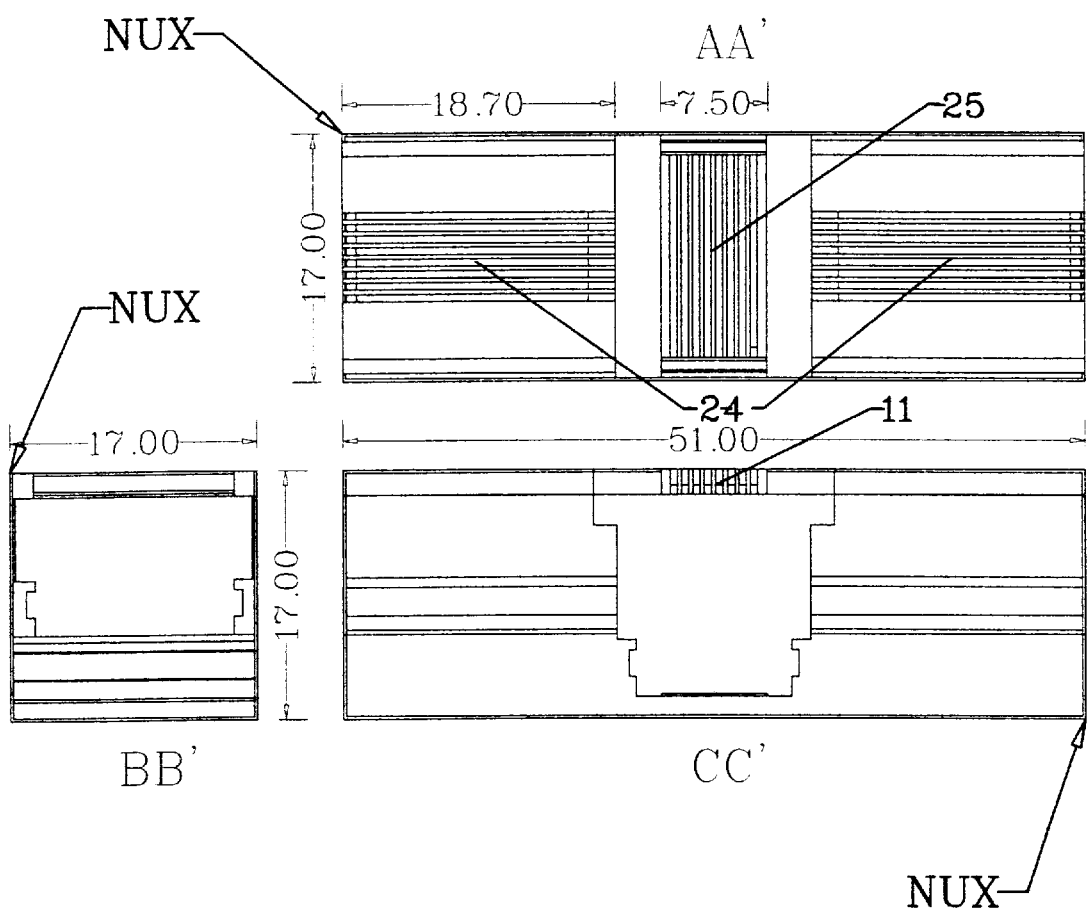
FIG. 22,23 & 24 present a horizontal and two vertical cross-sections of the NUX.
Figure 25:
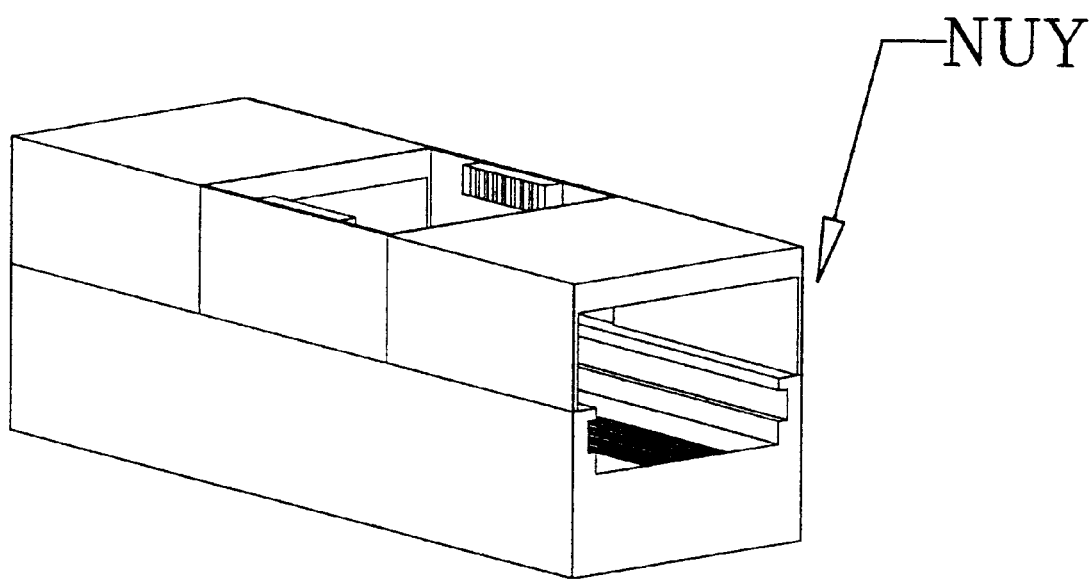
FIG. 25 presents a perspective view of the Node Unit Y (NUY)
Figures 26, 27, 28:
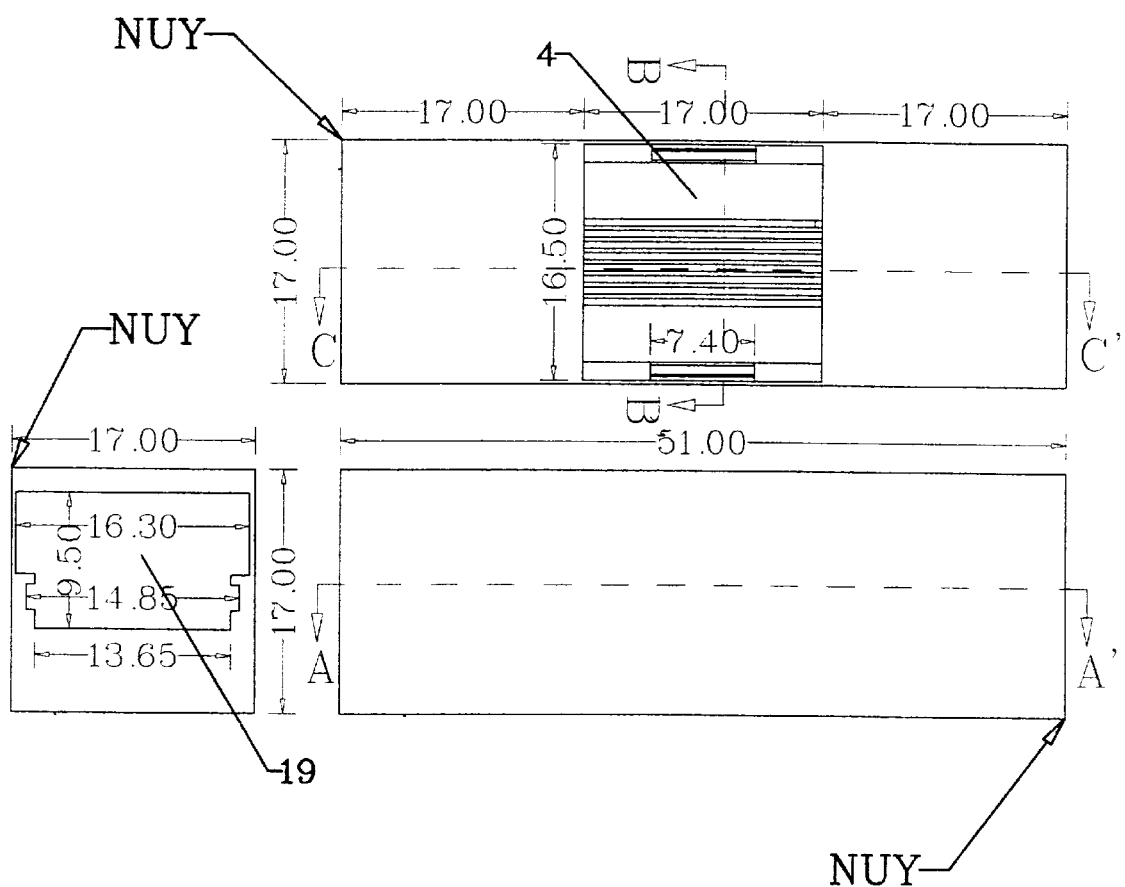
FIG. 26, 27 & 28 present the top, a side & the front view of the NUY, respectively.
Figure 32:
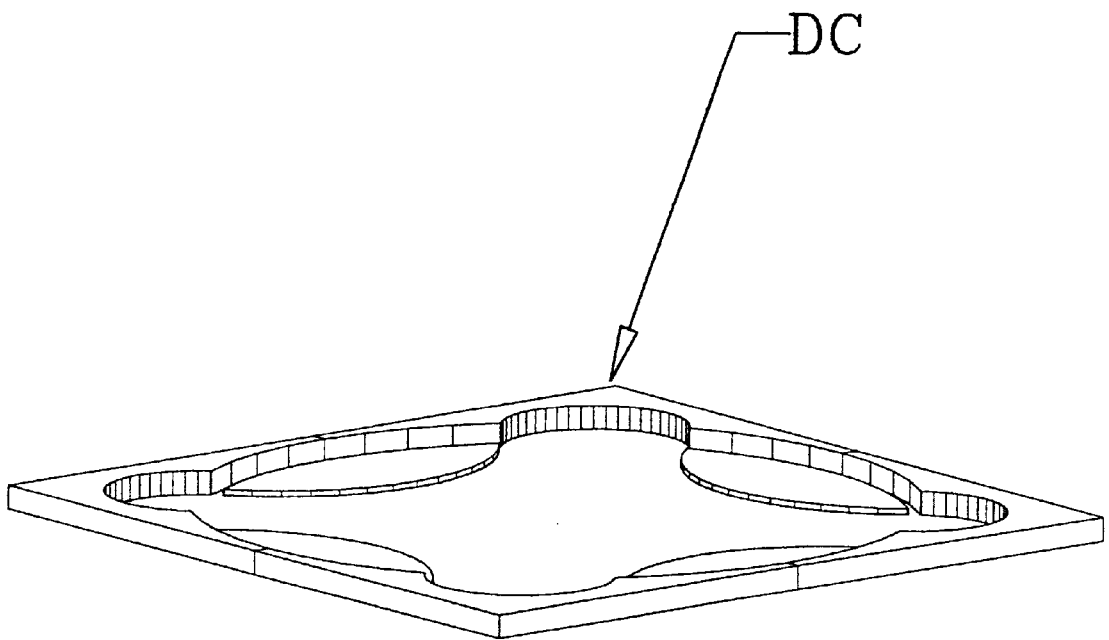
FIG. 32 presents a perspective view of the Disk Case (DCs)
Figure 33:
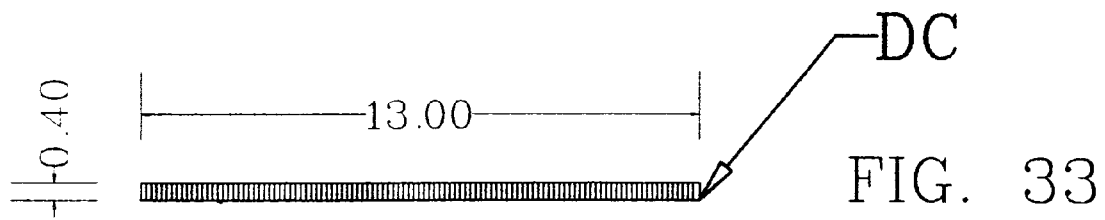
FIG. 33, 34 & 35 present the side view, the cross-section as well as top view of the DCs, respectively.
Figure 34:
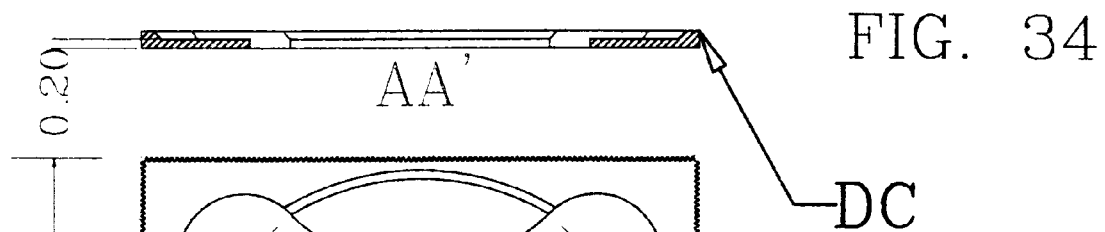
Figure 35:
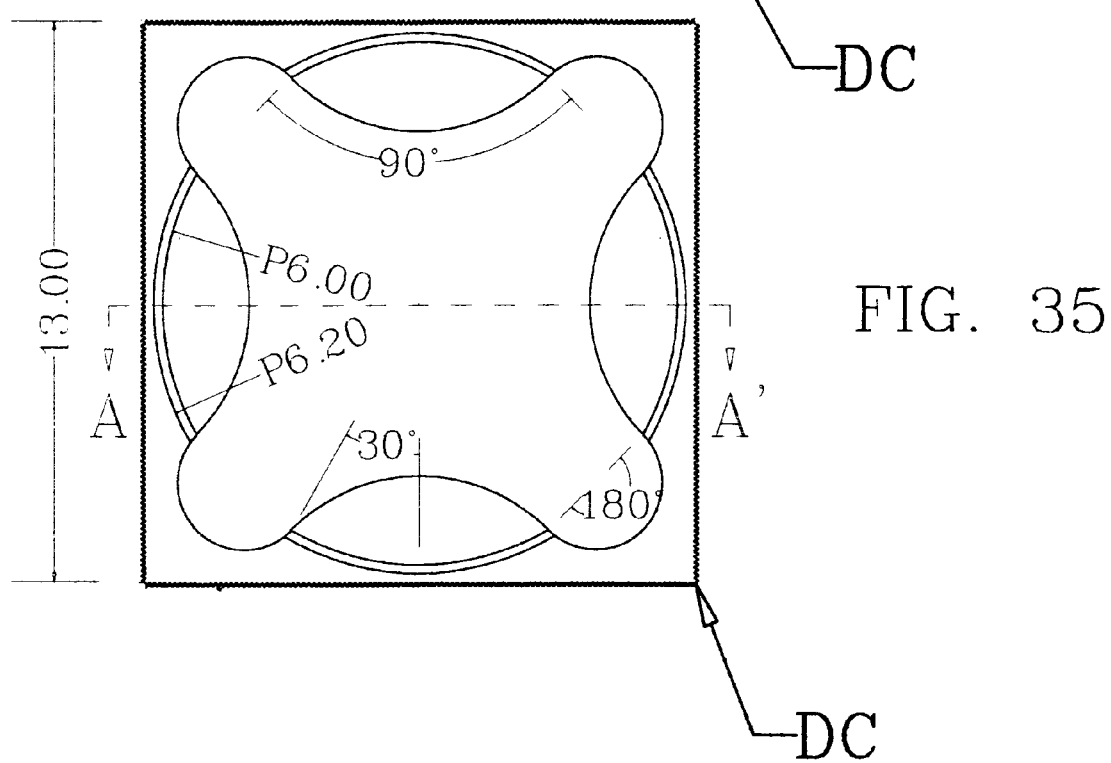
Figure 36:
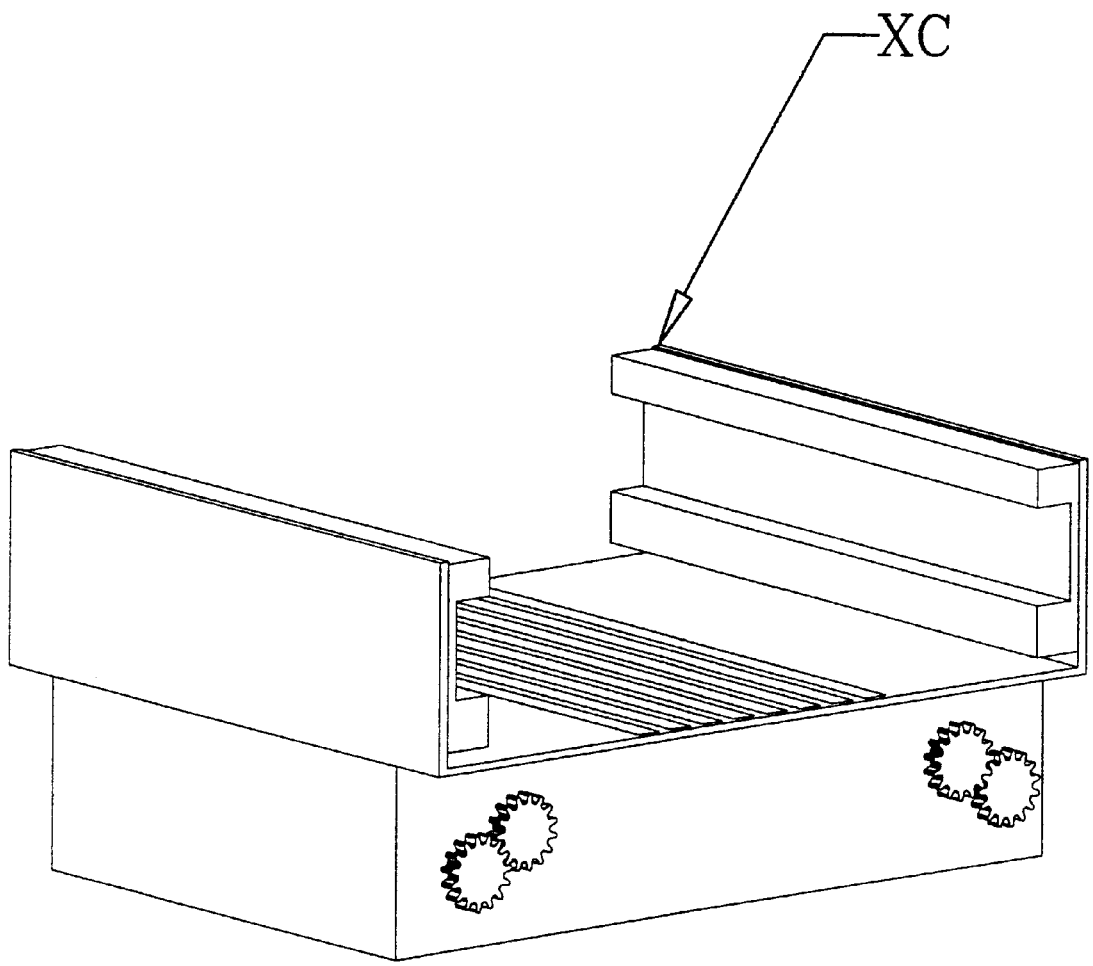
FIG. 36 presents a perspective view of the X Carrier (XC)
Figure 40:
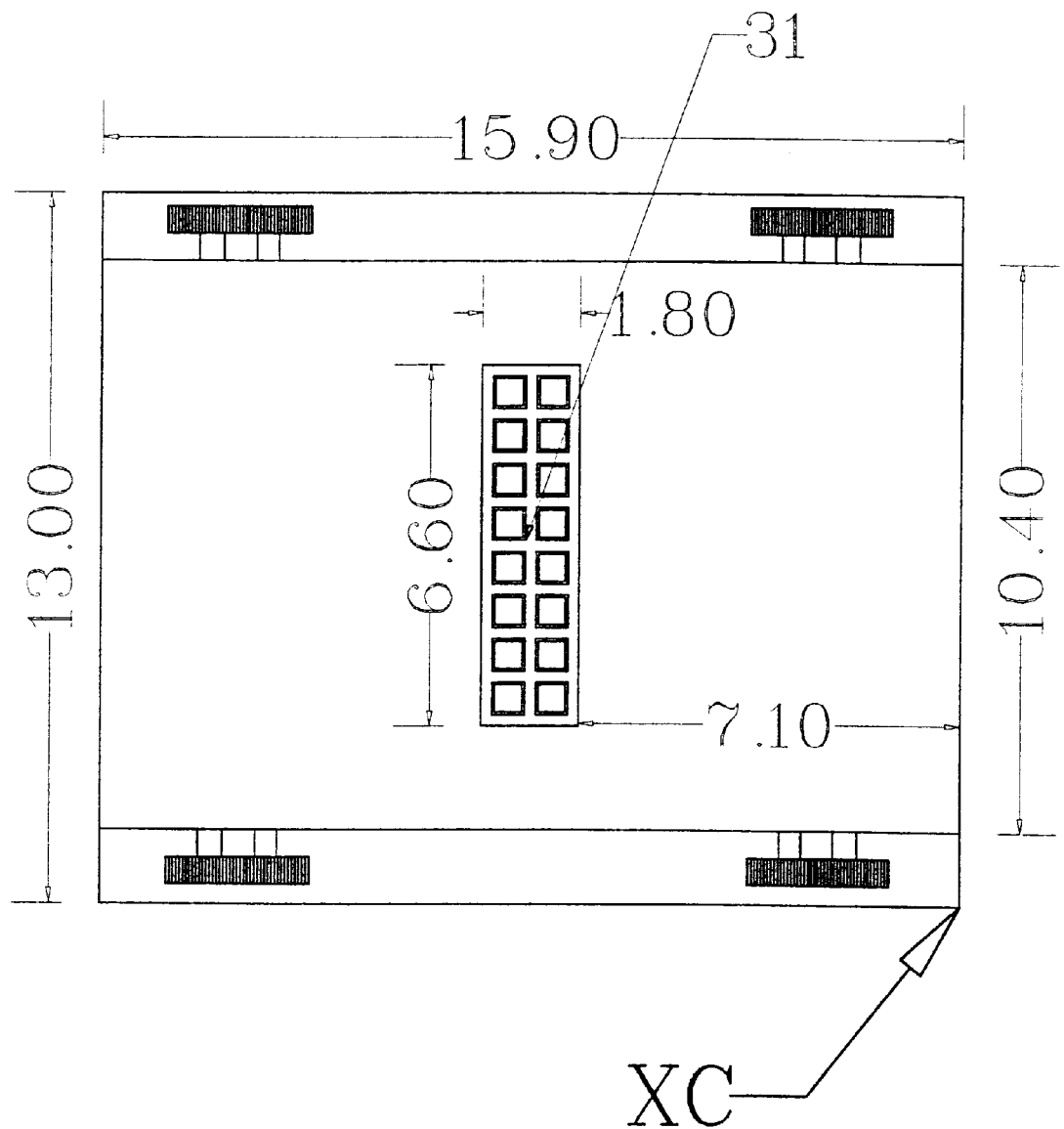
FIG. 40 presents the bottom view of the XC.
Figure 44:
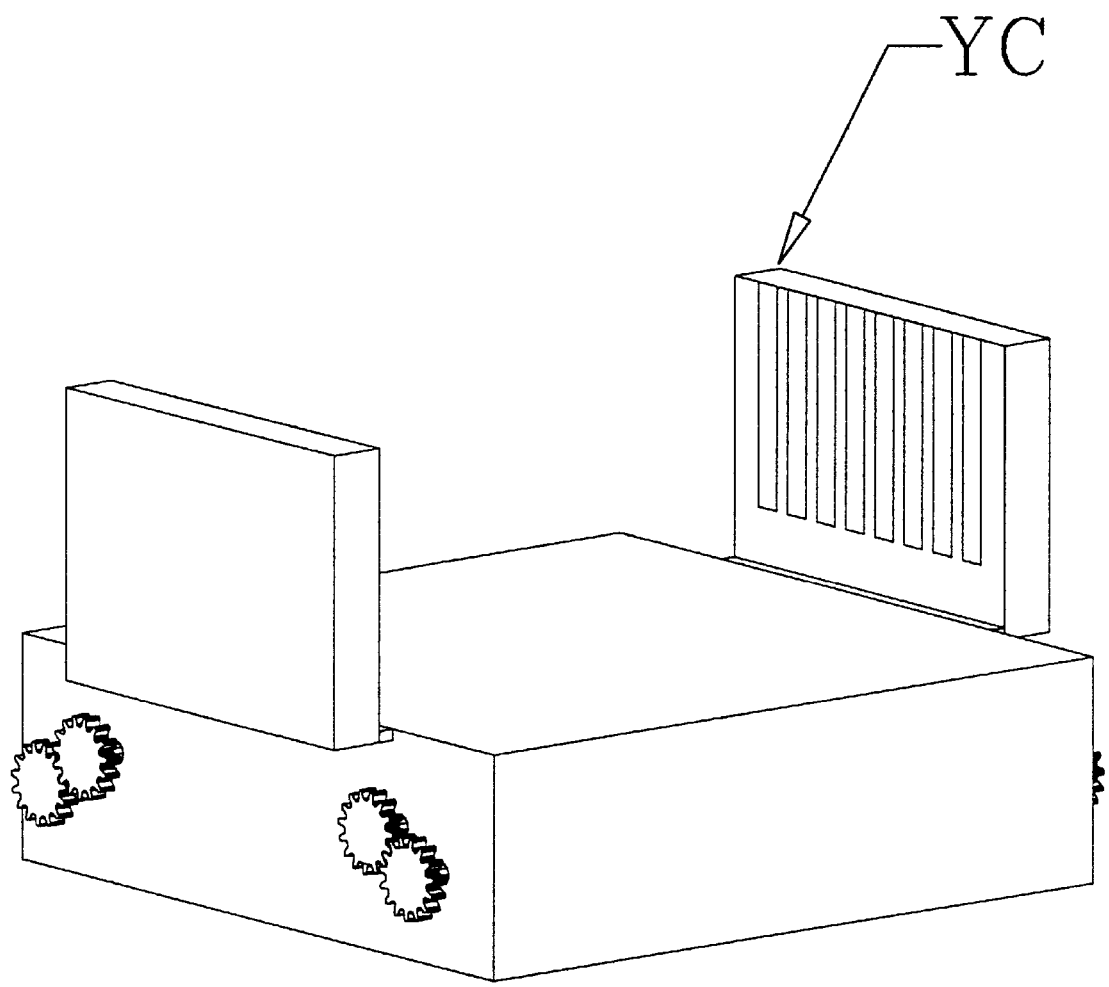
FIG. 44 presents a perspective view of the Y Carrier (YC)
Figure 48:
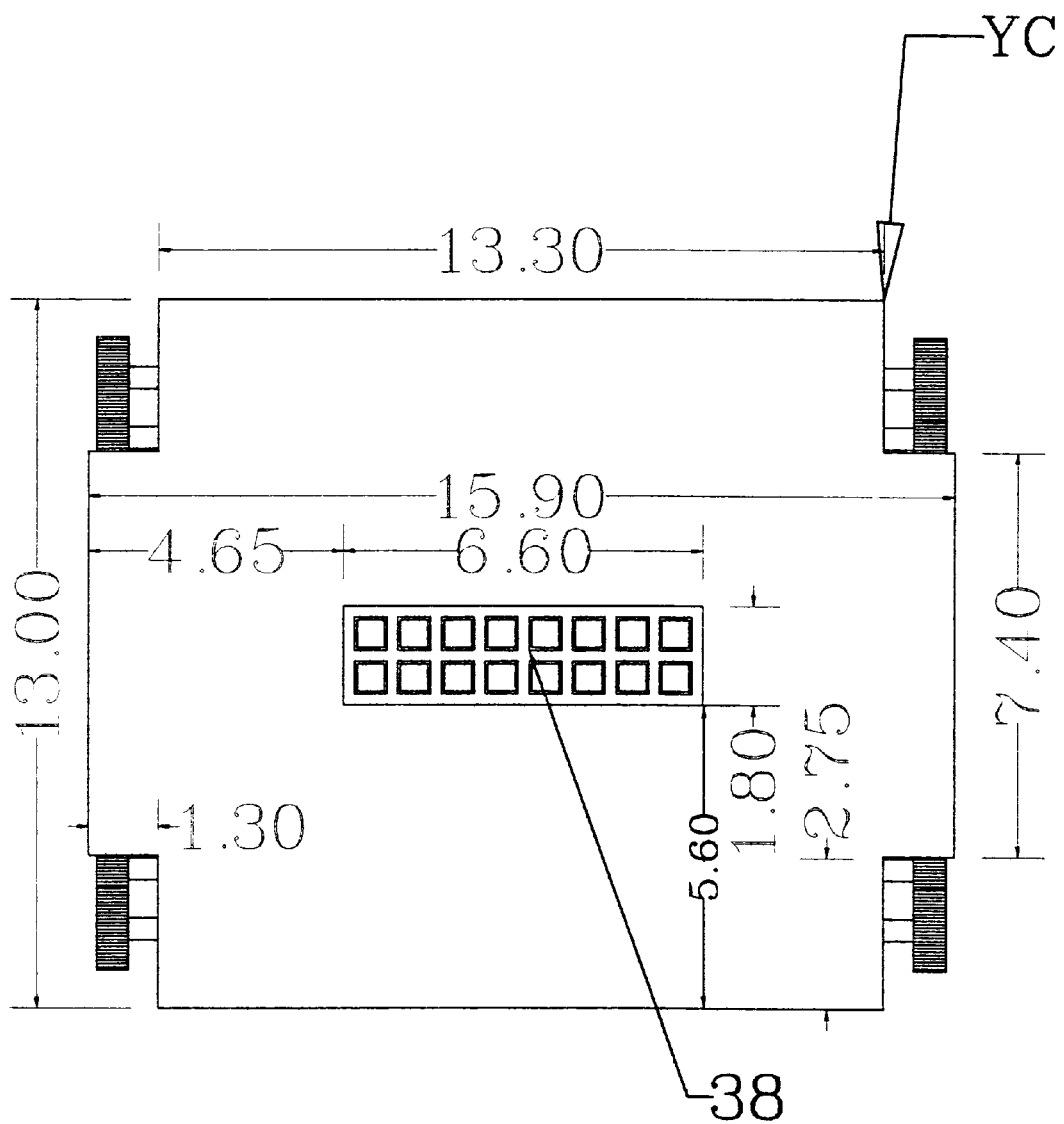
FIG. 48 presents the bottom view of the YC.
Figure 52:
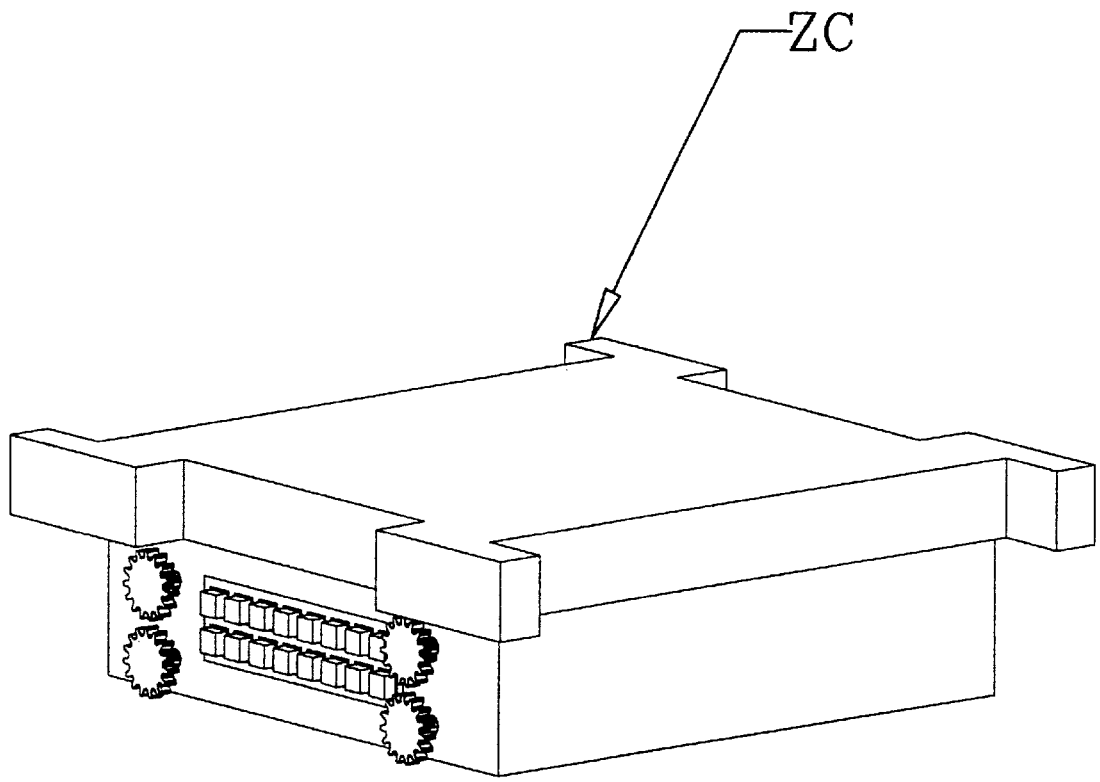
FIG. 52 presents a perspective view of the Z Carrier (ZC)
Figure 58:
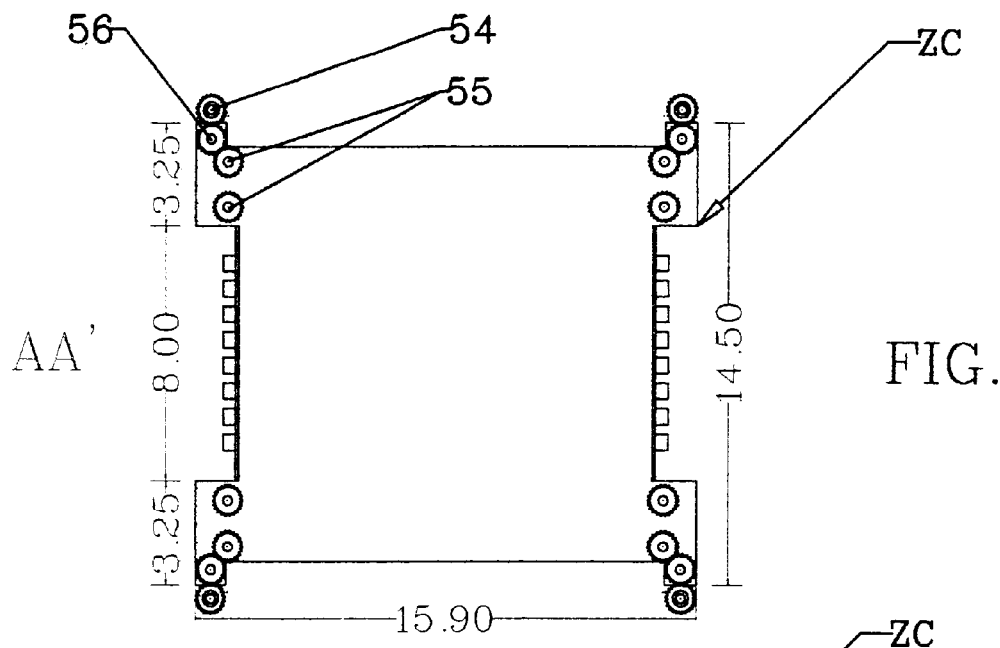
FIG. 58 & 59 present two horizontal cross-sections of the ZC.
Figure 59:
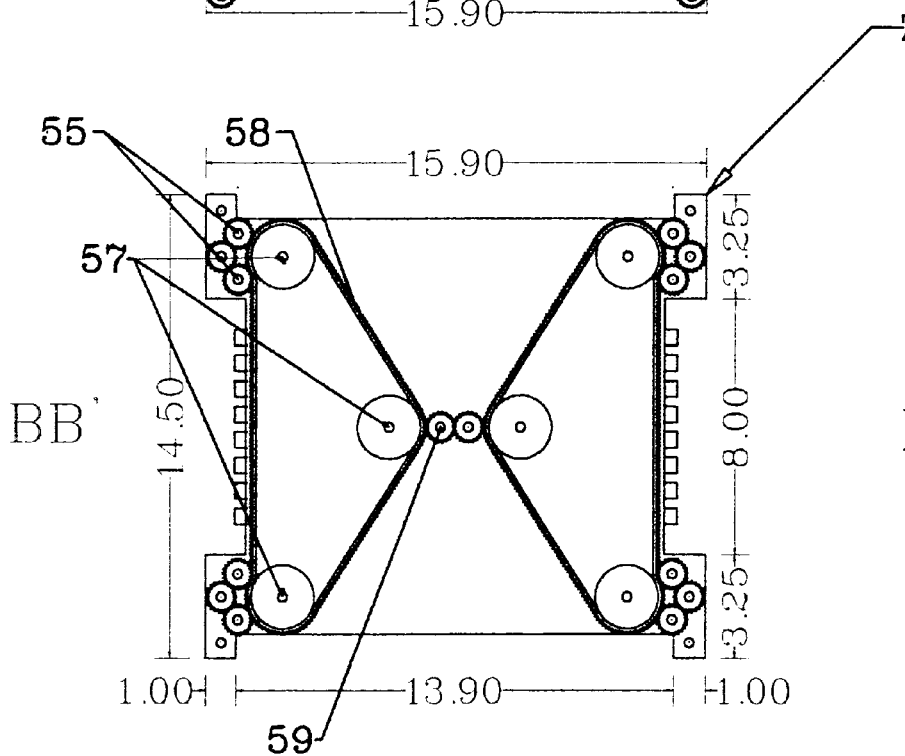
Figure 60:
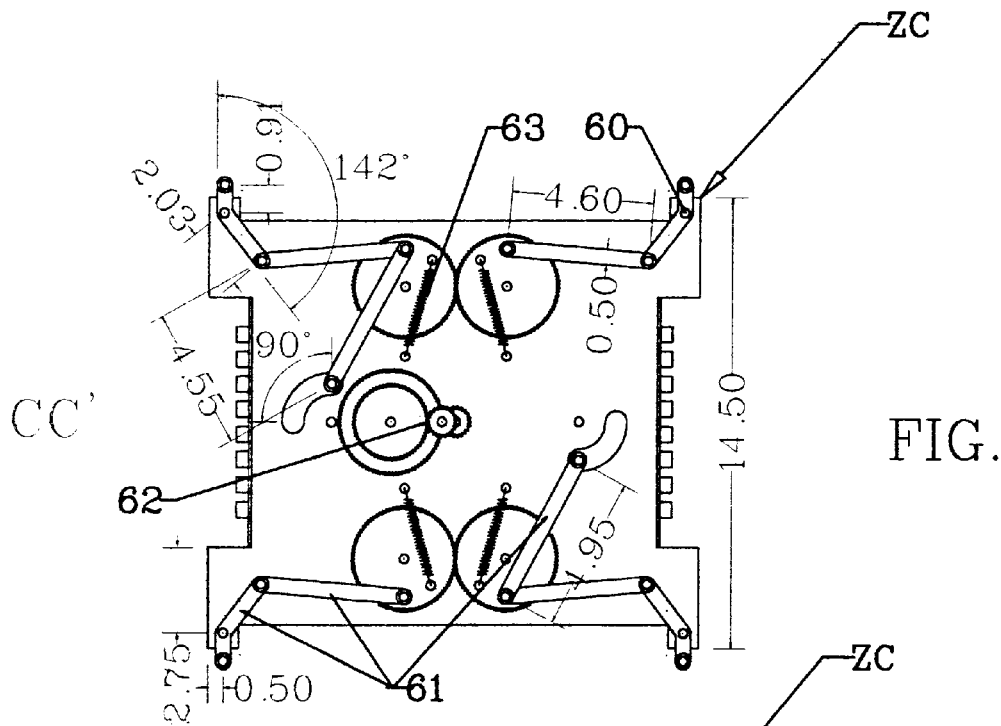
FIG. 60 & 61 present two more horizontal cross-sections of the ZC.
Figure 61:
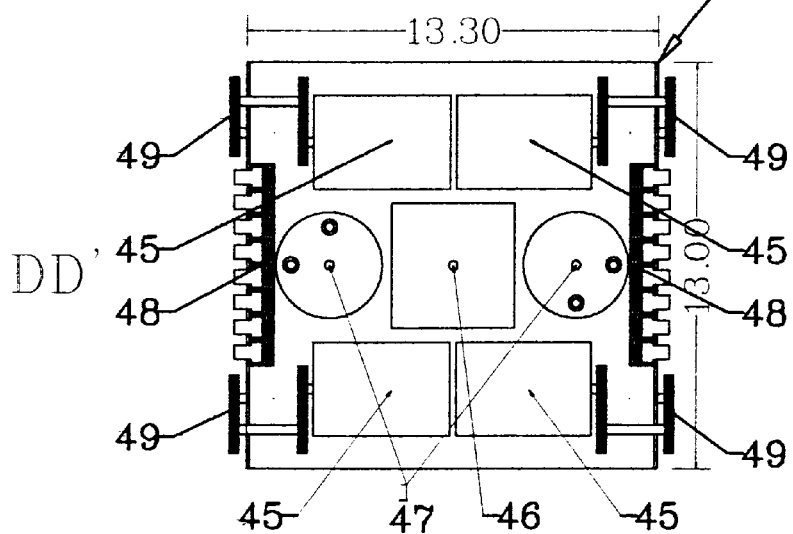

As already mentioned, the basic system units are
the basic module referred to Control and playing Unit (CU),
the storage module referred to Storage Unit (SU),
the node modules referred to Node Units (NUX, NUY);
More specifically, the structural units of the system are described below:

The Control and playing Unit (CU), as presented in FIG. 1–10, includes a controlling the drivers(10) of the CD movement servomechanisms throughout the system and the CD players(7), manipulating the system information files (CD contents and system topology) and providing system interfacing. In particular, the CU includes a CD I/O port (1), an LCD monitor assembly (2), a system power supply switch (3), a PC mother board (8), an LCD monitor (12), a 3.5 inch FDD (13) and a keyboard (14).

The CU further includes the storage medium (Hard Disk Drive or other),
the Input devices (keyboard, FDDS, serial & parallel ports, remote control device or other)(14),
the output devices (screen, printer, FDD, serial & parallel ports, or other)(12,13),
The CD players (7),
the power supply units (6),
storage space for 100 CDs (5) and
three parallel channels in the Z direction(4), branches of the DTC, through which the transportation of the CDs to the other system units is performed.

The Storage Units (SU), as presented in FIG. 11–17, are placed on stacks and contain CD storage places(5) of the system. The SUs contain a Z direction branch of DTC(4) through which the transportation of the CDs to the other system units is performed and include Zbus contacts (11) and Z direction carrier (ZC) motion spur gears (15). The CDs are placed in two columns on two opposite sides of the DTC in the Z direction, and the storage capacity of each column will be 75 CDs (a total of 150 places. There is an empty DCs (DiskCase)(29,30) for every storage place in order to accept the new CD which is going to be placed on that position.

Figure 62:
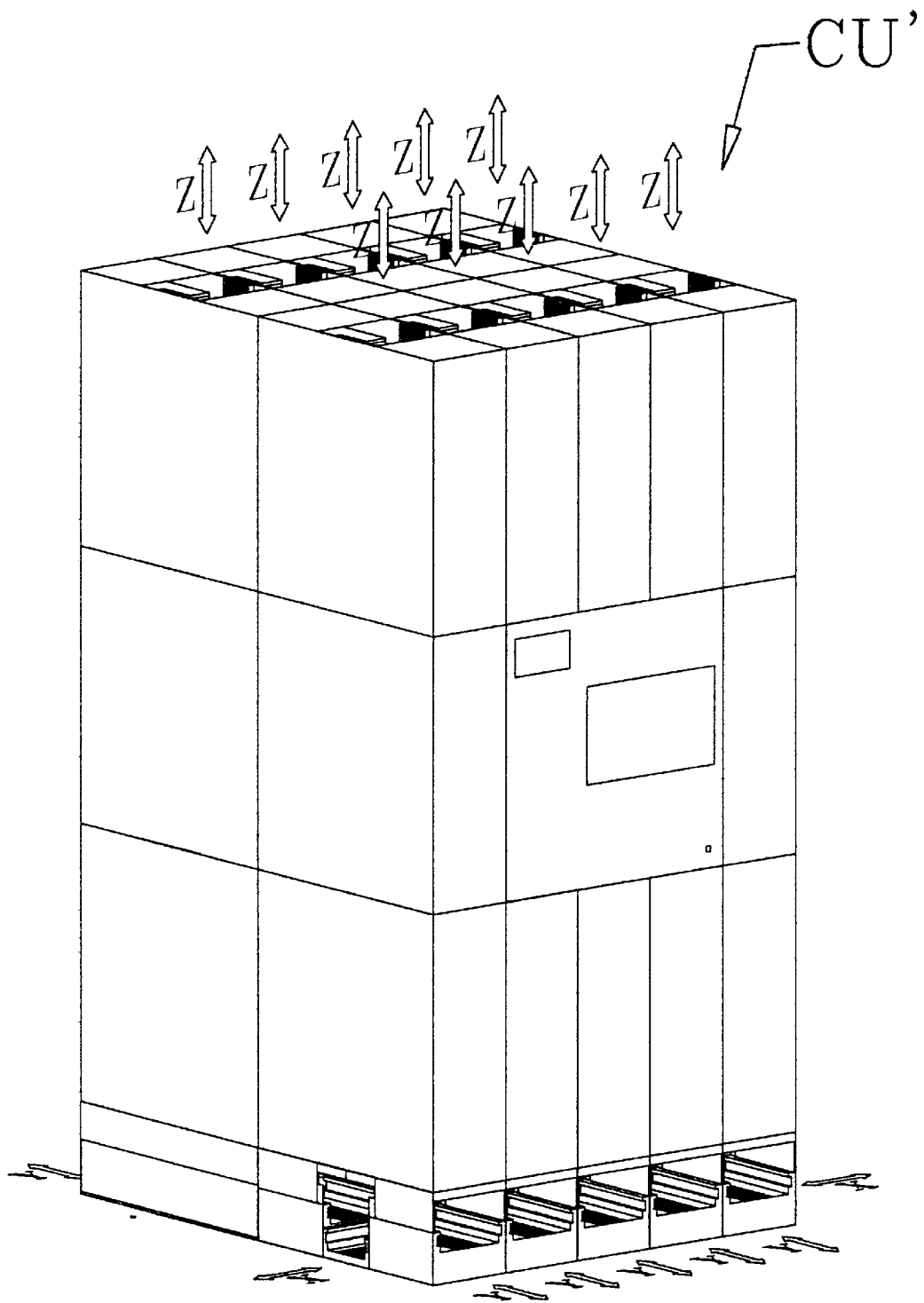
FIG. 62 presents a perspective view of a system configured for 4,150 CDs.

The Node Units (NUX, NUY), as are presented in FIG. 18–31, are placed only on the base level of the system. The NUXs are placed one beside the other and form the only branch of the DTC in the X direction(20). The NUYs are placed one behind the other starting from the NUXs and form the parallel branches of the DTC in the Y direction(19). The system can consist of one to sixty four NUs. Each branch of the DTC in the Z direction(4) (which is contained in a SU stack) starts from a system NU (NUX, NUY). In FIG. 62, which presents a view of the system, one can see that the NUXs are placed in the front of the system base level, in the X direction, while the NUYs are placed behind them. As already mentioned, the SUs are placed on stacks above the NUXs and NUYs, while the CU takes the place of three adjacent SUs. In the same FIG. 62, one can also see the DTC branches in all three dimensions. For the CD movement inside the DTC, a CD case (DCs) and three servomechanism devices (referred to as Movement Carriers— MC) are used, which are described below.

The Disk Case (DCs) is presented in FIG. 32–35 and is the case on which every new CD is placed in order to be carried around the system. The DCs is appropriately formed to facilitate its placement in the SU, its movement throughout the system and its insertion in the CD player.

Figure 63:
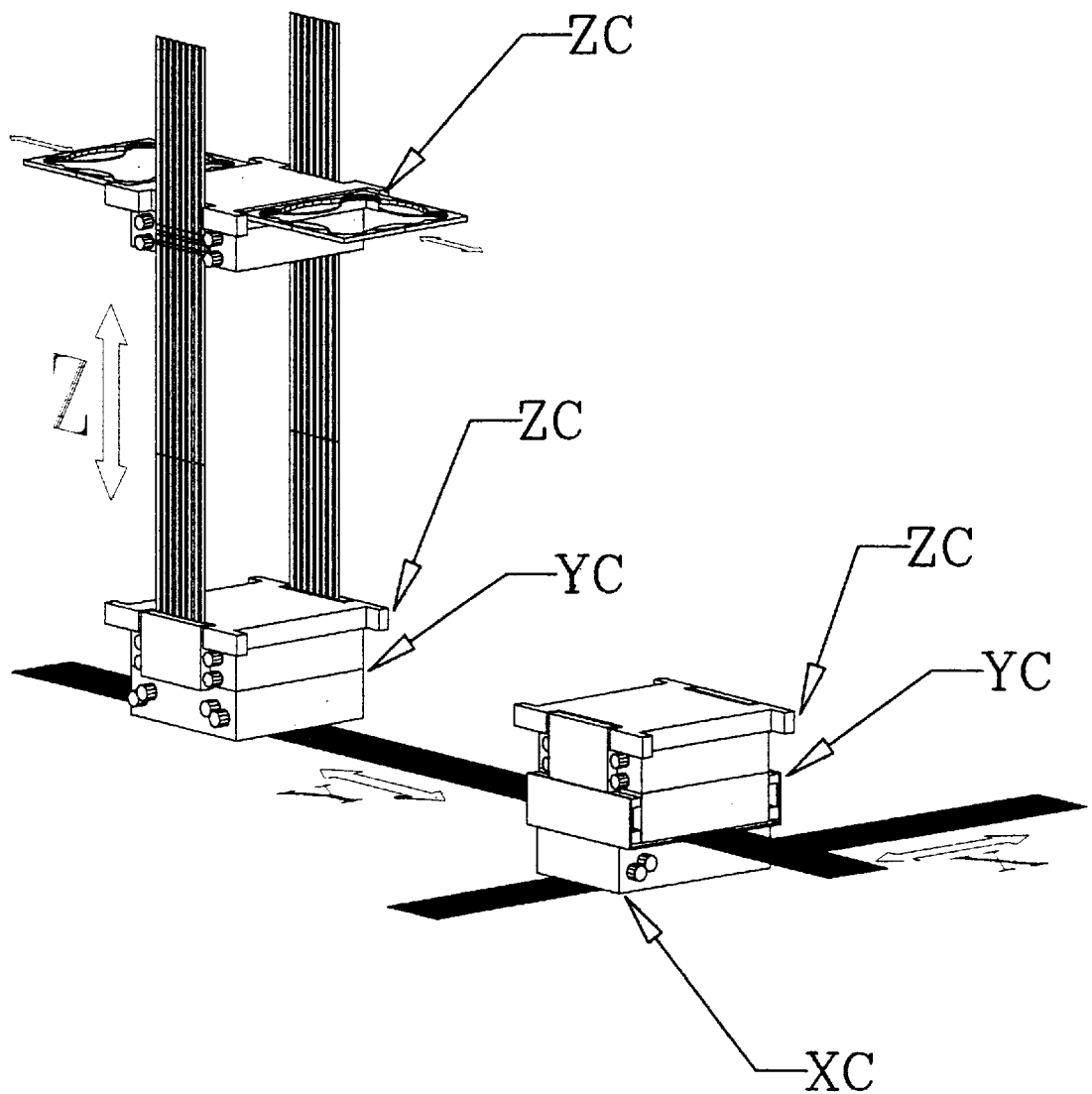
FIG. 63 presents a perspective view of the XC, YC & ZC movements throughout the system.

The Z Carrier (ZC) is a device controlled by the PC, with the purpose to move the DCs (with the CD on it) in the DTC in the Z direction along the SU stack in which the DCs is positioned, to place or draw the DCs in or from the storage position, to approach the CD player position and the system's new CD insertion position. The ZC, as presented in FIG. 52–61, has gears(49) to facilitate its movement through the DTC, step motors(45) to ensure the precision of its movement, micro-switches to detect the DCs's exact place on it DC motion step motors (46), DC grabbing rotary solenoids (47), DC motion level (50), DC motion level gears (51), DC grabbing level (52), DC selection gear (54), DC motion gears (55), pivot gears (56) for selection gear engagement, timing belt pulleys (57), timing belt (58), step motor gear (59), grabbing arm pivot (60), grabbing arms (61), DC motion transmission gears (62) and DC grabbing lock springs (63). As presented in FIG. 63, the motor power supply and the micro-switch signals are ensured via the constant contact with the conducting lines on the walls of the DTC (utilizing carbon brushes)48). In order for the movement to be continued in the Y direction, the ZC is lowered to the base level (where the NUX or the NUY is placed) and places itself on the YC.

The Y Carrier (YC) is a device controlled by the PC, with the purpose of moving the ZC and, finally, the DCs (with the CD on it) in the DTC in the Y direction from the NUY of the SU stack bottom, in which the DCs is positioned, and along the Y direction to the NUX. If the SU stack in which the CD is positioned is above a NUX, there is no movement in the Y direction. The YC, as presented in FIG. 44–50, has gears(41) to facilitate its movement through the DTC, step motors(40) to ensure the precision of its movement, microswitches to detect the ZC exact place on it and ZC motion rails (39). As presented in FIG. 63 the motor power supply and the micro-switch signals are ensured via the constant contact with the conducting lines of the walls of the DTC (utilizing carbon brushes)(38). In order for the movement to be continued in the X direction, the YC places itself on the XC.

Figure 64:
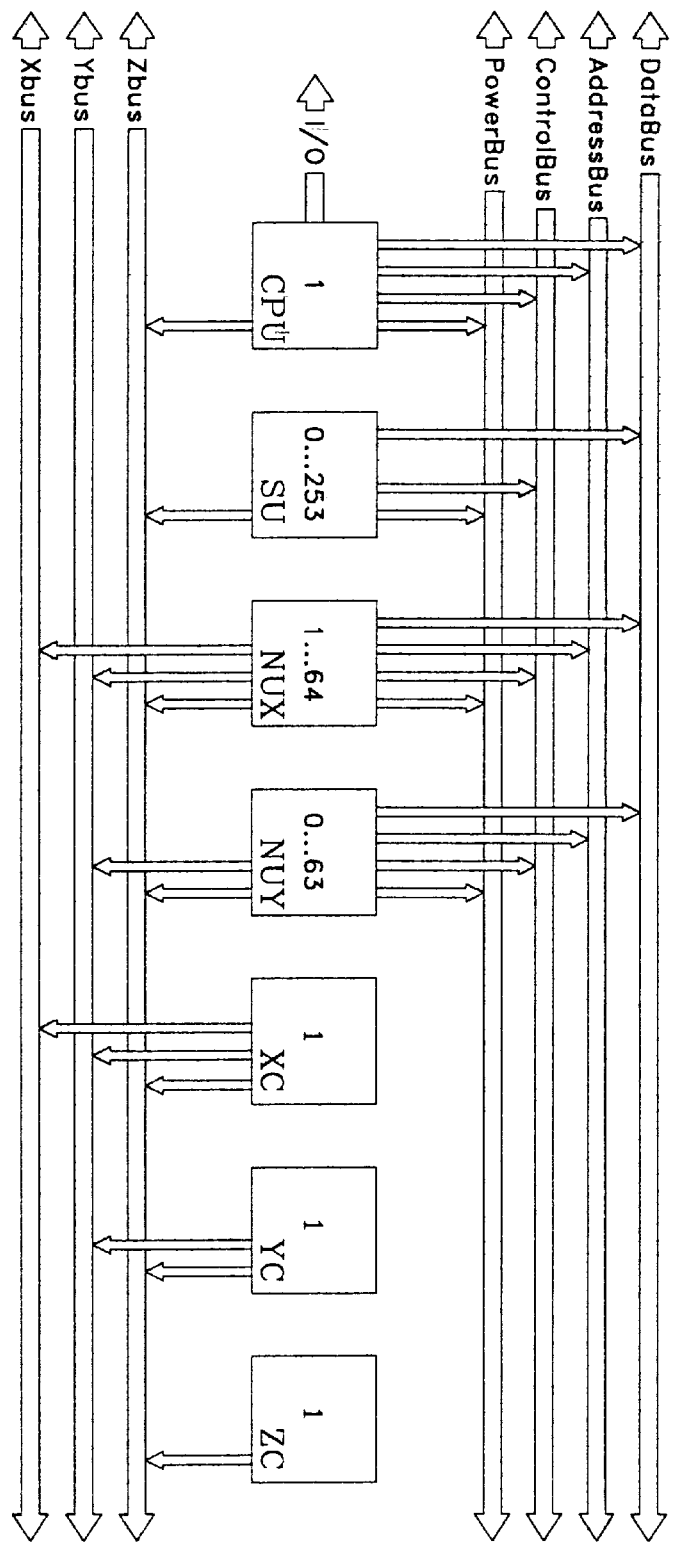
FIG. 64 presents the power supply, control, data and address bus wiring of the system.

The X Carrier (XC) is a device controlled by the PC, with the purpose of moving the YC, the ZC and, finally, the DCs (with the CD on it) in the DTC in the X direction from the NUX belonging to the Y direction with the SU stack, in which the DCs is positioned, and along the X direction to the NUX of the CU. The XC, as presented in FIG. 36–43, has gears(33) to facilitate its movement through the DTC, step motors(32) to ensure the precision of its movement and micro-switches to detect the ZC's exact place on it and includes XC motion rails (34). As presented in FIG. 63, the motor power supply and the micro-switch signals are ensured via the constant contact with the conducting lines on the walls of the DTC (utilizing carbon brushes)(31). The XC, as it moves, carries along with it the YC and the ZC with the CD on top of each other. Each time, there is only one path to be followed by the MCs in order to carry the DCs with the CD on it from one place of the system to the other, as presented in FIG. 63. The PC controls the ZC, YC and XC movement through contacts with the lines Z (Zbus), Y (Ybus) and X (Xbus) correspondingly, which run along the DTC. In every system structural unit (CU, SU, NUX, NUY) the Zbus, Xbus and Ybus are connected with the control lines (control bus), the data lines (data bus), the address lines (address bus) and the power supply lines (power bus). All these lines run along the system units and jump from unit to unit through plug connections. FIG. 64 presents the above mentioned lines, which are described below:

The address bus (AB) are 6-bit digital data lines, which are used to locate the stack where the YC (and therefore the ZC) lies. Every NU can access the AB, and when the YC lies on it (on the NU) the relative signal circuitry is activated and transmits the NU ID-code to the CU via the AB.

The power bus (PB) includes the power supply lines for all the circuits of the system units. The voltages used are +5 V, +12 V dc and GND.

The control bus (CB) includes 18 lines through which the step motors of the ZC, XC and YC and the solenoids (which control the DCs movement from and towards the ZC) are controlled (8 lines for ZC, 4 lines for XC & YC respectively and 2 lines for the solenoids).

The data bus (DTB) includes 6-bit digital data lines through which signals are transmitted to the CU concerning the system condition. The lines are:
one bit for the detection of the ZC on top of the YC,
one bit for the detection of the YC on top of the XC,
one bit for the detection of the YC inside the NUY,
one bit for the detection of the XC inside the NUX,
one bit for the detection of the DCs on top of the ZC,
one bit for the detection of the CD inside the DCs,
The Xbus, Ybus and Zbus include Xbus contacts (25), Ybus contacts (24) and Zbus contacts (11) which are lines running along the sides of the DTC in all the three directions (X, Y and Z) and used for the control of the XC, YC and ZC step motors. The XC has part of the Ybus on it and the YC has part of the Zbus.
The Input-Output lines (I/O bus) are digital data lines through which the CU controls, along with the XC, YC and ZC, the CD player, the CD I/O port (CDIOP)(1) mechanism and the remote control (RC) commands.
The handling related to the system structure includes the following activities:
insertion of a new CD to be filed into the system,
removal of a filed CD from the system,
CD placement from one SU to another in the same system,
insertion of a new SU or NU into the system,
removal of a SU or NU from the system,
system topology modification, and
removal of a SU, with the contained CDs, from one system to another.
The handling related to the system use includes the following functions:
information input concerning the CD contents during its insertion into the system;
and modification of this information whenever necessary,
choosing and playing a certain selection from a CD,
creating a selection program and modification of this program whenever necessary,
creating a group of selection programs and modification of this group whenever necessary; and
manipulation of the information data base.
More specifically, the above mentioned possibilities include the following activities.
A new CD may be inserted to be filed into the system. The user informs the system via an input device (keyboard, remote control) that a new CD is going to be inserted.
The CU activates the CD I/O Port (CDIOP). The CDIOP is a device that occupies storage places and always contains an empty DCs which projects out of the system in order to accept the new CD. This is realized by means of a motor, controlled separately by the CU via the I/O bus.
The user, after he places the new CD, informs the system of the insertion and the CDIOP returns to its position. The ZC fetches the DCs with the new CD and forwards it to one of the two CD players. Then, the contents of the CD are analysed and the system asks the user to fill the fields of the information file related to the new CD.
The user has two choices. The first is to let the system read the data from a magnetic diskette (FD) via the FDD drive. The second is to insert the data using the keyboard and answering to the PC monitor prompts.
The PC finds, from the system topology information file, the first empty storage place and moves the XC which carries on top of it the YC, the ZC and the DCs which contains the new CD, from the <<place of rest>> (HOME), located on the CU and along the X part of the unique moving path which leads to the empty storage position.

After that, the YC separates from the XC carrying the ZC, the DCs and finally the CD and follows the Y part of the moving path.

Finally, the ZC separates from the YC carrying the DCs and the CD and moves itself to the level of the empty storage place and puts the DCs with the CD on it to the empty space.

The ZC moves one place up and fetches the next empty DCs and following the opposite process places it on the CDIOP in order to accept the next new CD.

A filed CD may be removed from the system. The opposite process of the insertion of a new CD is followed.

A CD may be placed from one SU to another in the same system. The process utilized is the same as in the insertion of a new CD into the system, differing only in that the home position is now the old storage place of the CD.

A new SU or NU may be inserted into the system. The user informs the system via an input device that a new unit is going to be connected. The system asks the position of the new unit on the topology diagram (shown on the monitor). After it accepts the information requested, it gives the new unit a code number which must coincide with the number selected by the position of the dip switches of the new unit. The user shuts down the system (power off), sets the dip switches to the appropriate position representing the unit address and locks the new unit by means of special screws with the adjacent units and puts the system on (power on) in order for the changes to take effect.

A SU or NU may be removed from the system. The procedure is exactly the same as that of the insertion of a new SU or NU, with the exception of the physical removal of the unit.

The system topology may be modified by a combination of the above described removal/insertion of a unit.

A SU may be removed with the contained CDs, from one system to another. The user informs the system that a unit with its CDs is going to be removed, thus changing the topology according to the above mentioned. At the same time, the system prepares a file of the removed CDs with their contents and stores it on one or more FDs. The user locks the unit in the other system and inserts the data in its topology and data information files.

A certain selection may be chosen and played from a CD The DCs with the chosen CD must be carried from its storage position—with the aid of XC, YC and ZC and following the unique path which connects the two positions—and is inserted into the first available CD player in the CU which plays the selection.

After the playing process, the system restores the CD to its original position.

A selection program can be created and modified whenever necessary. This can be achieved by manipulating the data base and the selection sequence, performed as described above. While performing one selection, the system prepares the next one, thus eliminating the time space between the selections.

A group of selection programs may be created and modified whenever necessary. According to this process, the user can produce many selection programs for various tastes, using the above mentioned procedure, and transfer the first selection of every program to a storage position buffer near by the CD players, in order to interconnect the programs during playing without time spaces between programs and selections.

The information database may be manipulated. This means that using an appropriate software, the user can modify not only the selection programs but the data base itself customizing it to fill his/her needs.

The system follows an expansion pattern based on a module with the following proposed dimensions in cm: $[X] * [Y] * [Z]=17 * 51 * 17$ which equals the dimensions of the NU, while the SU dimensions are $17 * 51 * 51$ cm i.e. three times the NU and the CU dimensions are $51 * 51 * 51$ cm i.e. three times the SU or 9 times the NU, as shown in the Figures which present the CU, SU and NU (NUX, NUY). The quantity of the filed CDs depends on the number of the connected storage units (SU). Vertically, four (4) SUs can be connected because of the weight limitations reaching a height of $(4 * [SU])+[NU]=(4 * 51)+17=221$ cm. Horizontally (on base level) up to 64 NUs can be connected (proposed quantity) of a total area of $64 * 17 * 51=5.8752$ $m^2$. The maximum complete system's volume is approximately 13 $m^3$ and can file (64 * 4 * 150)−450+100=38,050 CDs, where 450 is the equivalent CD capacity of the CU (which takes the place of three SUs) while 100 is the storage capacity of the CU itself. The system capacity limit of 38,050 CDs covers, practically, every need of a potential user. FIG. 62 depicts a system CU' configured for a capacity of 4,150 CDS. For greater filing capacities, a network of such systems can be used utilizing common information files and thus creating a new mega-system of infinite capacity.

I claim:

1. A modular digital disk filing system, with automatic disk selection and playing, comprising:

a basic module having a microcomputer, media devices, a point of a new digital disk entrance in the system, a plurality of system motors and controllers to control the system motors;

three independent carrier mechanisms, one for each of an X-dimension, a Y-dimension, and a Z-dimension in space to carry the digital disks;

a plurality of node modules, each said node module being adapted to receive at least one of said carrier mechanisms for said Y-dimension and said Z-dimension and being adapted to change a direction of a disk along one of said X-dimension, Y-dimension or Z-dimension with the aid of said carrier mechanisms; and a plurality of storage modules to store the digital disks therein, whereby by plugging together said basic module with said node modules and said storage modules, and by gradually increasing the number of said node modules and said storage modules along all of said dimensions, the disk storage capacity is increased without any change in functionality of the system, the system remaining as a stable assembly.

2. A modular digital disk filing system, as claimed in claim 1, in which:

a disk transportation channel extends through all said node modules with branches in said three dimensions in a way that stored disks, the media devices and the point of a new digital disk entrance in the system can be approached with the aid of said carrier mechanisms.

3. A modular digital disk filing system, as claimed in claim 2, wherein said carrier mechanism is adapted to change direction in said disk transportation channel within said node modules which are arranged on one level.

4. A modular digital disk filing system, as claimed in claim 3, wherein:

said node modules are adapted to be plugged into each other side by sides said storage modules are adapted to be plugged into a top of said node modules in as many columns as the total number of said node modules;

said basic module is adapted to be plugged into any column on top of said node modules, thus assuring that there can be at least one path connecting two positions in said disk transportation channel.

5. A modular digital disk filing system, as claimed in claim 4, wherein:

the digital disks are carried along said disk transportation channel by said carrier mechanisms controlled by said basic module, without any wiring, but through electrical contacts utilizing carbon brushes.

6. A modular digital disk filing system, as claimed in claim 1, wherein the digital disks are placed in the system, on square cross-section trays with notched sides, to facilitate their handling.

7. A modular digital disk filing system with automatic disk selection and playing, comprising:

a basic module having a microcomputer, media devices, a point of a new digital disk entrance in the system, a plurality of system motors and controllers to control the system motors;

three independent carrier mechanisms, one for each of an X-dimension, a Y-dimension, and a Z-dimension in space to carry the digital disks;

a plurality of node modules, each said node module being adapted to receive at least one of said carrier mechanisms for said Y-dimension and said Z-dimension and being adapted to change a direction of a disk along one of said X-dimension, Y-dimension or Z-dimension with the aid of said carrier mechanisms, wherein a disk transportation channel extends through all said node modules with branches in said three dimensions in a way that stored disks, the media devices and the point of a new digital disk entrance in the system can be approached with the aid of said carrier mechanisms such that said carrier mechanism is adapted to change direction in said disk transportation channel within said node modules which are arranged on one level; and a plurality of storage modules to store the digital disks therein, wherein said node modules are adapted to be plugged into each other side by side, said storage modules are adapted to be plugged into a top of said node modules in as many columns as the total number of said node modules, said basic module is adapted to be plugged into any column on top of said node modules, thus assuring that there can be at least one path connecting two positions in said disk transportation channel, such that by plugging together said basic module with said node modules and said storage modules, and by gradually increasing the number of said node modules and said storage modules along all of said dimensions, the disk storage capacity is increased without any change in functionality of the system, the system remaining as a stable assembly, further wherein the digital disks are carried along said disk transportation channel by said carrier mechanisms controlled by said basic module, without any wiring, but through electrical contacts utilizing carbon brushes such that after the insertion of a new digital disk in the system, information files in said basic module are adapted to be updated with contents of the new digital disk, and topology information files which describe each module position in the system are adapted to be updated, after a new module is plugged into the system.

8. A modular digital disk filing system, as claimed in claim 7, in which:

the system is modifiable in all of said dimensions by re-plugging said storage or node modules thereby customizing the system to fit various space needs, updating only topology information files, without any change in functionality of the system, the system remaining a stable assembly.

9. A modular digital disk filing system, as claimed in claim 8, in which:

any number of said storage or node modules is adapted to be unplugged, along with digital disks contained therein, from a first system and be plugged into a second system, thereby updating information files of the two systems, by moving a part of files related to the removed digital disks, from the information files of the first system to files of the second system and modifying topology information files of both systems.

* * * * *

UNITED STATES PATENT AND TRADEMARK OFFICE
CERTIFICATE OF CORRECTION

PATENT NO. : 5,940,356
DATED : August 17, 1999
INVENTOR(S) : Christos Toumbas

It is certified that error appears in the above-identified patent and that said Letters Patent is hereby corrected as shown below:

Column 1 Line 49 after "using the" delete --following--.

Column 1 Line 63 after "special case" insert comma --,--.

Column 2 Line 17 "the user" should read --a user--.

Column 3 Line 57 after "system;" insert --and--.

Column 3 Line 64 after "(SU)" insert --and--.

Column 3 Line 65 after "(NUX, NUY)" insert period --.--.

Column 4 Line 2 after "includes a" insert --PC--.

Column 4 Line 12 "FDDS" should read --FDDs--.

Column 4 Line 16 "The" should read --the--.

Column 4 Line 23 "contain CD" should read --contain the CD--.

Column 4 Line 67 after "on it" insert comma --,--.

Column 5 Line 10 "48)" should read --(48)--.

Column 5 Line 56 after "below" delete colon (:) and insert period --.--.

Column 6 Line 5 delete "are:" and insert --include--.

Column 6 Line 10 after "ZC" insert --and--.

UNITED STATES PATENT AND TRADEMARK OFFICE
CERTIFICATE OF CORRECTION

PATENT NO.   : 5,940,356
DATED        : August 17, 1999
INVENTOR(S)  : Christos Toumbas It is certified that error appears in the above-identified patent and that said Letters Patent is hereby corrected as shown below:

Column 6 Line 11 after "DCs" insert period --.--.

Column 7 Lines 42-43 after "from a CD" insert period --.--.

Column 8 Line 64, claim 4, "side by sides" should read --side by side--.

Column 8 Line 64, claim 4, after "side by side" insert semicolon --;--.

Column 9 Line 12, claim 6, after "wherein" insert colon --:--.

Signed and Sealed this

Twenty-fifth Day of April, 2000

Q. TODD DICKINSON

*Attest:*

*Attesting Officer*   *Director of Patents and Trademarks*